United States Patent
Moore, Jr. et al.

(10) Patent No.: US 9,373,204 B1
(45) Date of Patent: Jun. 21, 2016

(54) SYSTEM AND METHOD FOR TICKET VALIDATION

(71) Applicant: Motio, Inc., Dallas, TX (US)

(72) Inventors: J. Lynn Moore, Jr., Lucas, TX (US); Edward Kaplonski, Dallas, TX (US)

(73) Assignee: Motio, Inc., Dallas, TX (US)

( * ) Notice: Subject to any disclaimer, the term of this patent is extended or adjusted under 35 U.S.C. 154(b) by 290 days.

(21) Appl. No.: 13/871,439

(22) Filed: Apr. 26, 2013

Related U.S. Application Data

(60) Provisional application No. 61/638,975, filed on Apr. 26, 2012.

(51) Int. Cl.
G06F 17/00 (2006.01)
G07C 9/00 (2006.01)

(52) U.S. Cl.
CPC .................. G07C 9/00007 (2013.01)

(58) Field of Classification Search
USPC .......... 235/375, 380, 381, 382; 705/1.1, 26.1, 705/26.2, 26.3, 26.4, 67, 76, 80
See application file for complete search history.

(56) References Cited

U.S. PATENT DOCUMENTS

| | | | |
|---|---|---|---|
| 6,496,809 B1 | 12/2002 | Nakfoor | |
| 7,093,130 B1 | 8/2006 | Kobayashi et al. | |
| 7,540,415 B2 | 6/2009 | Frank et al. | |
| 2003/0105641 A1 | 6/2003 | Lewis | |
| 2007/0073605 A1* | 3/2007 | Kohavi et al. | 705/37 |
| 2009/0063207 A1 | 3/2009 | Brodzeller | |
| 2009/0198528 A1* | 8/2009 | Kahn | G06Q 10/02 705/5 |
| 2010/0088126 A1 | 4/2010 | Iaia et al. | |
| 2010/0113072 A1* | 5/2010 | Gibson | G06Q 20/045 455/466 |
| 2010/0228576 A1 | 9/2010 | Marti et al. | |
| 2011/0040656 A1* | 2/2011 | Groetzinger | G06Q 30/0278 705/27.1 |
| 2011/0165933 A1 | 7/2011 | Guziel et al. | |
| 2011/0178891 A1 | 7/2011 | Charriere | |
| 2011/0197283 A1 | 8/2011 | Maruyama et al. | |

FOREIGN PATENT DOCUMENTS

| | | |
|---|---|---|
| DE | 20003253 U1 | 8/2000 |
| WO | 99/60489 | 11/1999 |

OTHER PUBLICATIONS

Nathesh, Mobile Barcode Innovations Featured Article, "Skycore Releases its CodeREADr Platform", Jun. 10, 2010, available at mobile-barcode.tmcnet.com/topics/mobile-baroode-innovations/articles/88129-skycore-releases-its-codereadr-platform.htm and retrieved on Oct. 25, 2011 (2 pgs).

* cited by examiner

*Primary Examiner* — Michael G Lee
*Assistant Examiner* — Tabitha Chedekel
(74) *Attorney, Agent, or Firm* — Elizabeth Philip Dahm; Kelly J. Kubasta; Ferguson, Braswell & Fraser, PC

(57) ABSTRACT

A method and system is provided for facilitating ticket exchange by validating ticket authenticity. Images of the barcodes of tickets are captured and decoded so that the encoded ticket information may be analyzed. Encoded ticket information is compared to event ticket information stored in a ticketing database, and the result is transmitted to prospective buyers to ensure authenticity and establish confidence in the sale. Tickets may also be pre-validated by ticket holders or designated sellers of ticketing companies, who are located near the event venue. Buyers interested in purchasing tickets may locate pre-validated tickets using GPS.

20 Claims, 15 Drawing Sheets

SYSTEM AND METHOD FOR TICKET VALIDATION

CROSS-REFERENCE TO RELATED APPLICATION

This application claims priority to U.S. Provisional Patent Application No. 61/638,975, entitled "System and Method for Ticket Validation", filed on Apr. 26, 2012, which is hereby incorporated by reference for all purposes.

TECHNICAL FIELD

The present disclosure relates generally to an interactive communications system, and in particular, to a ticket validation system.

BACKGROUND

Sales, resales, and exchanges of tickets commonly occur between associated or unassociated parties. A ticket is a physical or electronic document that gives a holder of the ticket permission to enter an area, attend an event, or perform another suitable activity. For example, a ticket may be a physical document that allows the holder of the document to enter a musical concert, sporting event, comedic performance, performance art, theatrical performance, other suitable event, or a combination thereof.

When a sale, resale, or exchange of tickets occurs between unassociated parties, prospective buyers of the tickets may be unable to verify the authenticity of the tickets being purchased. Thus, the prospective buyers may assume that the event tickets being offered by the seller are legitimate and valid for the event indicated on the ticket. For example, the assumption made by the prospective buyers may be based exclusively on the assertion by the seller that the tickets are legitimate and valid for the event printed on the face of a physical ticket.

SUMMARY

Embodiments of the present disclosure generally facilitate the exchange, sale and resale of event tickets, where prospective buyers may ensure the authenticity of the tickets under consideration, while maintaining a reasonable price for the ticket holder.

According to some embodiments of the present disclosure, a ticket holder or a prospective buyer captures the barcode of a ticket, which is then decoded to extract the encoded ticket information; the encoded ticket information is then compared against event ticket information stored in a ticketing database; and the result of the analysis is transmitted to the user to ensure the sale of only authentic event tickets.

In some embodiments, a ticket holder captures the barcode of a ticket prior to the engagement of a prospective buyer, which is decoded to extract the encoded ticket information; the encoded ticket information is then compared against event ticket information stored in a ticketing database; and the result of the analysis is transmitted to prospective buyers, along with the ticket holder's location to facilitate the sale of pre-validated tickets.

In some embodiments of the present disclosure, a ticket holder captures the barcode of a ticket, which is then decoded to extract the encoded ticket information; the encoded ticket information is then compared against event ticket information stored in a ticketing database; the result of the analysis is transmitted back to the ticket holder, along with a request to confirm the ticket holder's desire to sell the ticket and at what price; and a ticket sale listing is then generated and managed to facilitate the sale of the pre-validated ticket.

In various embodiments, a captured barcode image of a ticket may be received from an inquirer. The barcode image may be decoded and ticket information may be extracted from the decoded barcode. Valid ticket information associated with the ticket may be retrieved from a database, and a determination may be made whether the ticket is valid at least partially based on the extracted ticket information and/or the retrieved valid ticket information. A validation fail message may be transmitted responsive to a determination that the ticket is not valid. Event ticket information associated with the ticket may be transmitted.

Embodiments may include one or more of the following. A captured image of the ticket may be received from the inquirer, and the captured barcode image may be and/or include the captured barcode image received image. A captured image of the ticket may be received from the inquirer, and ticket information associated with the ticket may be received. The ticket information may be automatically determined based on the captured image of the ticket, and determining whether a ticket is valid is at least partially based on the received ticket information. In some embodiments, ticket information associated with the ticket may be received, and the ticket information may have been automatically determined by the inquirer using NFC. Determining whether a ticket is valid may be at least partially based on the received ticket information. In some embodiments, a validation success message may be transmitted responsive to a determination that the ticket is valid. The event ticket information may include an image of a view from a ticket seat associated with the ticket, a retail value of the ticket, one or more links to information, whether the ticket has already been transferred to another buyer, and/or one or more reviews related to a seller of the ticket. Determining whether the ticket is valid may be based on criteria provided by the user. An insurance purchase option associated with the ticket may be transmitted. In some embodiments, a cost of insurance may be automatically determined based on one or more risk factors associated with the ticket, and the determined cost may be transmitted. A captured image of the ticket may be received from a first inquirer, and the captured image of the ticket may be transmitted to a second inquirer. The validation fail message may be transmitted to the second inquirer responsive to a determination that the ticket is not valid.

In various embodiments, a captured barcode image of a ticket may be received from a first inquirer. The barcode image may be decoded and ticket information may be extracted from the decoded barcode. Valid ticket information associated with the ticket may be retrieved from a database, and a determination may be made whether the ticket is valid at least partially based on the extracted ticket information and/or the retrieved valid ticket information. A validation success message may be transmitted to a second inquirer responsive to a determination that the ticket is valid. Location information associated with the first inquirer may be transmitted to the second inquirer.

Embodiments may include one or more of the following. A validation failure message may be transmitted to the second inquirer responsive to a determination that the ticket is not valid. Ticket holder information may be received, and determining location information associated with the first inquirer may be based at least partially on the ticket holder information. In some embodiments, retrieving valid ticket information may include communicating with a third party service to request and receive valid ticket information. A request may be received from the second inquirer for available tickets. Ticket information may be retrieved for ticket(s) available for purchase, and the received captured image of the ticket may include at least one of the tickets available for purchase (e.g., such that a ticket available for purchase may be validated).

In various embodiments, captured barcode image(s) of ticket(s) may be received from an inquirer. The barcode image(s) may be decoded and ticket information may be extracted from the decoded barcode(s). Valid ticket information associated with the ticket(s) may be retrieved from a database, and a determination may be made whether the ticket(s) are valid at least partially based on the extracted ticket information and/or the retrieved valid ticket information. Validation fail message(s) may be transmitted responsive to a determination that the ticket(s) are not valid and/or validation success message(s) may be transmitted responsive to a determination that the ticket(s) are valid. A list of websites where the seller may list one or more of the tickets for sale may be transmitted.

Embodiments may include one or more of the following. Pricing suggestion(s) for one or more of the tickets may be determined and/or transmitting to the inquirer. Ticket(s) for sale may be automatically listed on one or more of the websites of the list of websites. The ticket(s) for sale may be automatically removed from a listing on a website when one or more of the tickets are sold.

In some embodiments, a dashboard may be generated for presentation on the inquirer. The dashboard may include a listing status for one or more of the tickets.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides an efficient system and method of selling or re-selling event tickets. More particularly, the present disclosure provides a system and method of facilitating ticket exchange by ensuring the authenticity of the tickets and thereby establishing confidence in the sale.

Figure 1:
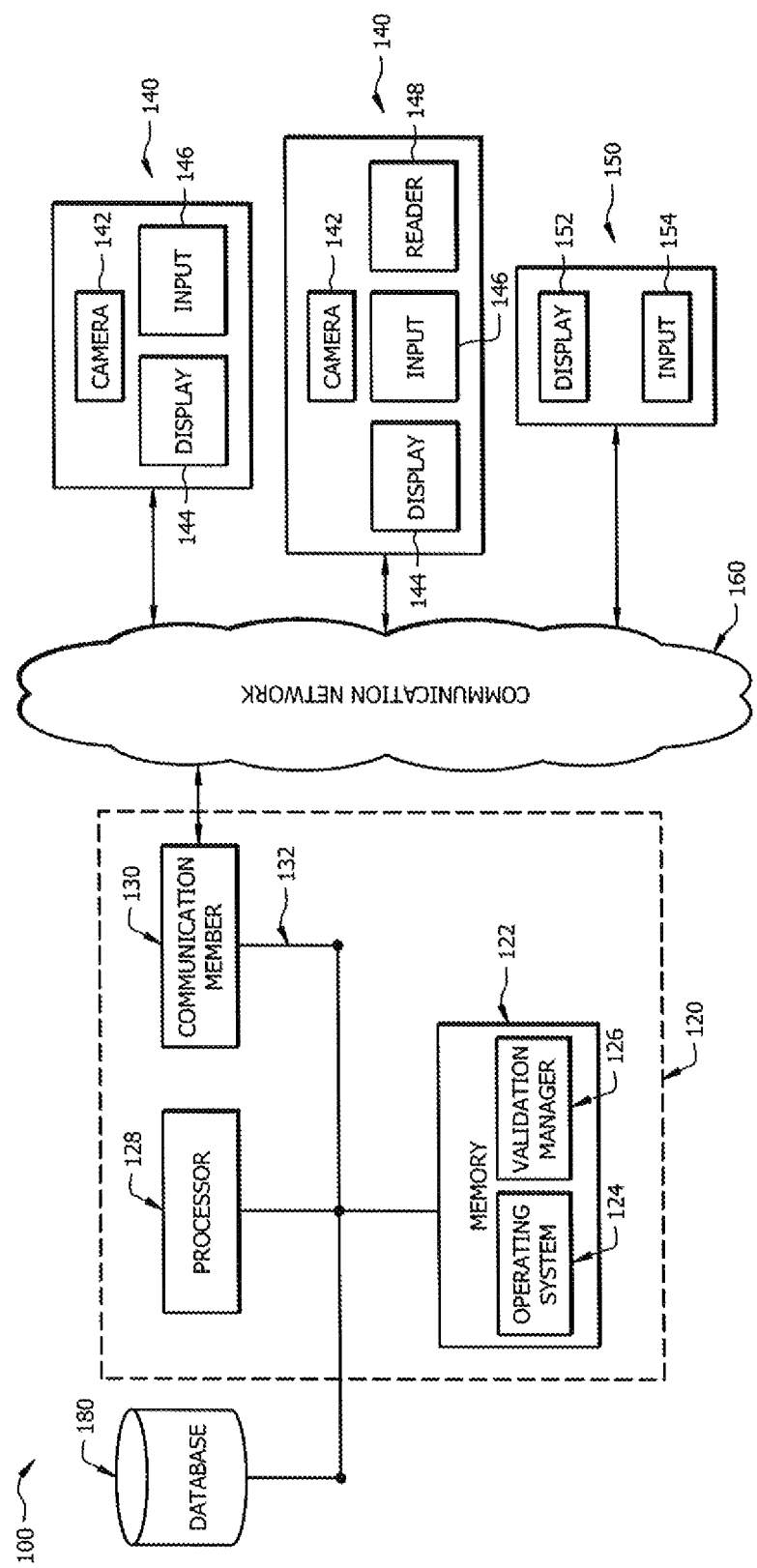
FIG. 1 is a block diagram of a computer environment for implementing a ticket validation system in accordance with one embodiment of the present disclosure.

FIG. 1 generally illustrates a ticket validation system 100 for verifying the authenticity of tickets according to some embodiments of the present disclosure. It should be understood that system 100 shown in FIG. 1 is for illustrative purposes only and that any other suitable system or subsystem could be used in conjunction with or in lieu of system 100 according to some embodiments of the present disclosure.

System 100 allows a plurality of inquirers 140 to communicate and interact with validation server 120 through a communications network 160.

Validation server 120 may generally include a computer system having a memory 122, at least one processor 128, and a communication member 130. Each element of the validation server 120 is coupled to bus 132 or other communication mechanism for relaying information.

Memory 122 comprises both random access memory (RAM) and read-only memory (ROM). Memory 122 may be employed to store program information, instructions to be executed by processor 128, and temporary information during execution of instructions by processor 128.

Within memory 122 reside operating system 124 and validation manager 126. Operating system 124 may be employed as a software platform upon which the ticket validation application programs may execute. Validation manager 126 may generally include program instruction sequences for verifying the authenticity of tickets.

Processor 128 may be employed to execute the program instructions that are stored by memory 122. Processor 128 is capable of identifying each inquirer 140 as well as communicating with each inquirer 140 via communications member 130 and communications network 160.

Communication member 130 comprises conventional hardware and software that facilitates coupling validation server 120 to communications network 160. For example, without limitation, communication member 130 may be an Ethernet controller in an embodiment in which communications network 160 is, at least in part, an Ethernet network.

In an embodiment, validation server 120 is coupled to a database 180. Database 180 is a collection of data that may be retrieved, searched, added to, removed from, or any combination thereof. In some embodiments, database 180 is one or more databases in or from a plurality of data sources. In other embodiments, database 180 may be one or more files of data, spreadsheets, or other suitable data structures.

Validation server 120 may store information associated with event tickets in the database 180. Validation server 120 may communicate with database 180 using remote procedure calls, standardized query language (SQL), an application programming interface (API), a Web service, or another suitable technology. Event ticket information stored in database 180 may be derived from ticket issuing sources, venue sources, other suitable source, or any combination thereof. Information stored in database 180 may include event names, event dates, event venues, event times, section numbers, seat numbers, original buyers, original ticket prices, and ticket photographs, including any identifiers such as watermarks, holograms, ultraviolet light holograms, ultraviolet ink, micro text, photographic perforation, ghost images, other suitable identifiers, or a combination thereof on the face of the ticket. Validation server 120 may also store information corresponding to each party to one ore more transactions associated with a particular ticket, such as names, addresses, phone numbers, buyer/seller reviews, or any other suitable party information, in the database 180. In the different illustrative embodiments, database 180 may or may not be under the control of the same party that controls validation server 120.

Inquirers 140 request that ticket validation server 120 validates ticket information by communicating with validation server 120 through communications network 160. Inquirers 140 may be located in any geographical location.

Each inquirer 140 may generally include at least one camera 142, to capture a barcode of a ticket, one display 144, to view ticket information, and at least one input device 146, to communicate with validation server 120. In other embodiments, an inquirer may not have the at least one camera 142. In such embodiments, inquirer 140 may be configured to receive and transmit images from another component or device.

In some embodiments, inquirer 140 may also include a reader 148, to extract and decode the ticket information encoded in the barcode of a ticket. As used herein, a barcode is a machine-readable representation of data. In these illustrative examples, a barcode may be printed on a physical document or displayed on an electronic display. The barcode may be encoded using one or more symbologies, such as Universal Product Code (UPC), Code 128, European Article Number 13 (EAN-13), PDF417, DataMatrix, Quick Response Code (QR code), other suitable symbologies, or a combination thereof.

Inquirers 140 may be a mobile phone, personal digital assistant, smart phone, notebook computer, laptop computer, tablet computer, desktop computer, other suitable Internet-capable device, or any combination thereof.

In operation, inquirers 140 may be utilized either by the ticket holder, the prospective buyer, or both.

Validation server 120 may also communicate ticket transaction information to interested parties 150. Ticket transaction information may include each party's name, address and phone number, the location of the transaction, and ticket information, such as the section number, seat number and price. Interested parties 150 may include event venue personnel, law enforcement, promoters, performers, representatives of performers, other parties interested in ticket exchange data, or any combination thereof.

Each interested party 150 may generally include at least one display 152, to view ticket transaction information, and at least one input device 154, to communicate with validation server 120.

Cameras 142 may be integrally built into or externally attached to inquirers 140.

Any of displays 144 and/or displays 152 may be a mobile phone screen, liquid crystal display (LCD), light emitting diode screen (LED), plasma screen, cathode ray tube (CRT) monitor, high definition television (HDTV) screen, conventional television screen, projection television screen, video conferencing display, other suitable display, or any combination thereof.

Any of input devices 146 and/or input devices 156 may be an alphanumeric keyboard, mouse, trackball, cursor direction keys, touch pad, Touch Tone telephone, wireless telephone, two-way pager, personal digital assistant, voice recognition device, touch screen, other suitable data input device, or any combination thereof.

The present disclosure is related to the use of validation server 120 to verify ticket information, as described herein. According to some embodiments of the present disclosure, execution of the instructions stored in memory 122 allows processor 128 to implement the functionality described above. In some embodiments, hardware circuitry may be used in conjunction with or in lieu of software instructions to implement the present disclosure. However, the present disclosure is not limited to any specific combination of hardware circuitry and/or software.

Figure 2:
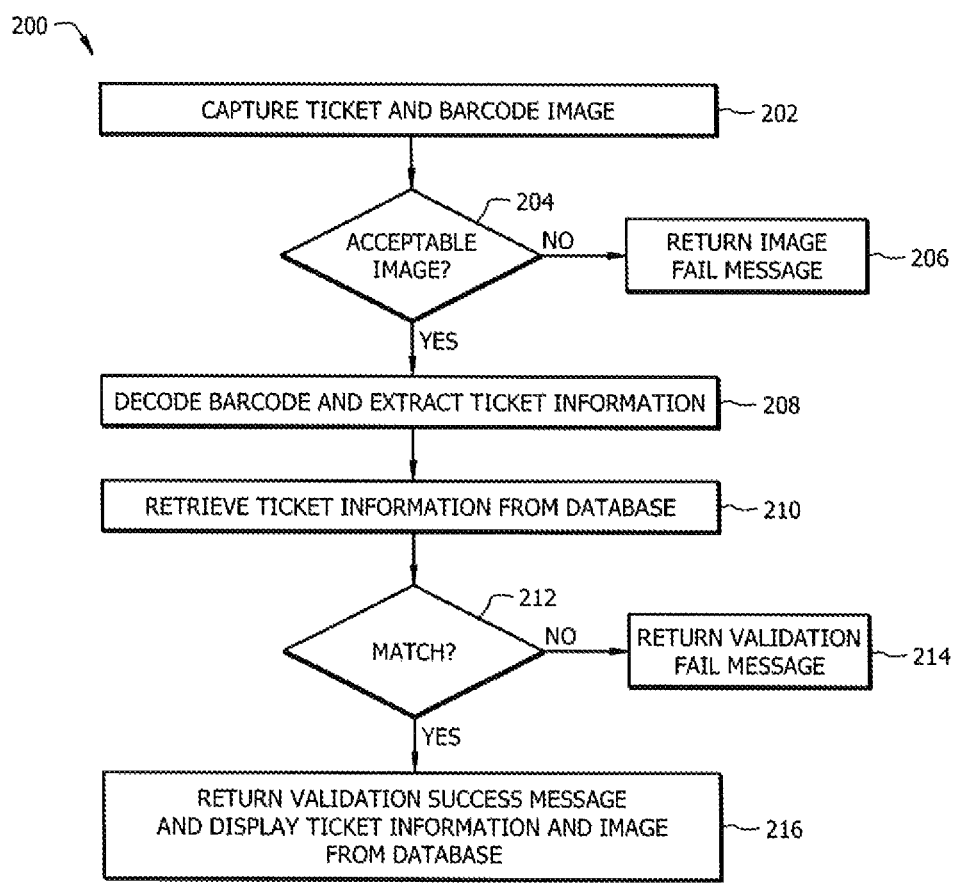
FIG. 2 is a somewhat simplified flow diagram illustrating a method of validating an event ticket in accordance with one embodiment of the present disclosure.

FIG. 2 is a somewhat simplified flow diagram illustrating method 200 of validating an event ticket according to some embodiments of the present disclosure. It should be understood that method 200 shown in FIG. 2 is for illustrative purposes only and that any other suitable method or sub-method could be used in conjunction with or in lieu of method 200 according to some embodiments of the present disclosure. It should also be understood that the steps of method 200 could be performed in any suitable order or manner.

In an embodiment, method 200 begins in step 202 with a user causing inquirer 140 to capture an image of a ticket and/or one or more barcodes on the ticket with inquirer 140 using camera 142. Inquirer 140 may then communicate the image to validation server 120 through communications network 160 using Bluetooth, Wi-Fi, infrared, text message, email, bump technology or by any other suitable manner.

In other illustrative embodiments, the user may cause inquirer 140 to capture information from the ticket in step 202 using near field communication (NFC). Such illustrative embodiments may be used in conjunction with tickets comprised of an NFC chip or tag, which may establish radio communication with an inquirer 140. The information captured may include an identifier associated with the ticket, as well as the name, date, and/or seat location of an event for which the ticket is valid, and other suitable information.

Validation manager 126 analyzes the image of the ticket to determine if inquirer 140 has communicated an image containing a barcode that can be decoded, as shown in step 204. In one illustrative embodiment, validation manager 126 attempts to decode data associated with the barcode. For example, validation manager 126 may process the image using one or more symbologies.

Validation manager 126 may determine that inquirer 140 has not communicated an image acceptable to decode when the image cannot be processed using any of the symbologies available to validation manager 126. If validation manager 126 determines inquirer 140 has not communicated an image acceptable to decode, the validation server 120 will return an image fail message to inquirer 140 that will be presented to the user through display 144 in step 206. For example, responsive to a determination that an image is not acceptable, an image fail message may be transmitted (e.g., to an inquirer).

If validation manager 126 determines inquirer 140 has communicated an image acceptable to decode, the validation manager 126 will decode the barcode of the ticket and extract ticket information, as shown in step 208. Ticket information encoded in the barcode may include the event name, event date, event time, event venue, and the section and seat number associated with the ticket. In other illustrative examples, the ticket information encoded in the barcode may include an identifier associated with the ticket.

In other illustrative embodiments, inquirer 140 may itself determine if the image captured in step 202 is acceptable. In such illustrative embodiments, inquirer 140 may attempt to process the image captured in step 202 using one or more symbologies available to inquirer 140. If the image is acceptable, inquirer 140 analyzes and decodes the barcode image to extract ticket information, as shown in step 208. Inquirer 140 may determine that the image captured in step 202 is acceptable when the image is successfully decoded using an available symbology.

In step 210, validation manager 126 retrieves information stored in a database, such as database 180, that is associated with the ticket in consideration, such as valid ticket information (e.g., ticket information associated with a valid ticket, such as formatting, codes, security marks, etc.). In one illustrative example, validation manager 126 provides the identifier.

In step 212, validation manager 126 determines if the ticket information encoded in the barcode of the ticket extracted in step 208 matches the event ticket information (e.g., valid ticket information) stored in database 180 retrieved in step 210. In some embodiments, the ticket information encoded in the barcode of the ticket extracted in step 208 matches the event ticket information stored in database 180 when the identifier decoded from the barcode on the ticket and provided by validation manager 126 to database 180 corresponds to a valid identifier in database 180.

In other embodiments in which information, such as event name, event date and time, and seat location, is encoded in the barcode printed on the ticket, the threshold for whether barcode matches the event ticket information can be user-defined (e.g., the user may provide criteria by which the validity of the ticket is determined). For example, in some embodiments, the threshold for whether the ticket information encoded matches can be user-defined as the barcode containing ticket information that corresponds to a selected sub-set of the total set of potential fields of ticket information, such as whether the event name, event date, event time, the section and seat number associated with the barcode corresponds to the event name, event date, event time, the section and seat number associated with the event ticket information. In some embodiments, the threshold can be user-defined to require an exact match of all of the specified fields of ticket information.

If validation manager 126 determines the information does not match, the validation server 120 will return a validation fail message to inquirer 140 that will be presented to the user through display 144, as illustrated in step 214. For example, responsive to a determination that the information does not match, the validation manager may transmit a validation fail message to an inquirer.

If validation manager 126 determines that the ticket information encoded in the barcode of the ticket matches the event ticket information stored in database 180, the validation server 120 will return a validation success message to inquirer 140 that will be presented to the user through display 144, as illustrated step 216. For example, if a determination is made that the information matches event ticket information stored in database 180 (e.g., valid ticket information), then a validation success message may be transmitted (e.g., to an inquirer).

Validation server 120 may also return event ticket information associated with the ticket, including an image of the view from the ticket seat, the retail value of the ticket seat, links to information about the event (weather, traffic, local restaurants, reviews of the events, opinions, betting lines, etc.), whether the ticket has already been transferred to another buyer, and reviews related to the seller. If the ticket has already been transferred to another buyer, the validation server 120 will return a validation fail message to inquirer 140 that will be presented to the user through display 144.

In other illustrative embodiments, inquirer 140 may purchase insurance for the transaction. Validation server 120 may calculate the cost of insurance based on a variety of risk factors related to the transaction, including, for example, the reviews related to the seller. In such illustrative embodiments, validation server 120 may return an insurance purchase option to inquirer 140 that will be presented to the user through display 144.

Optionally, an event ticket image may be transmitted to inquirer 140 and presented to the user through display 144 for visual verification so the user may confirm watermarks, holograms, ultraviolet light holograms, ultraviolet ink, micro text, photographic perforation, ghost images, other suitable identifiers, or a combination thereof on the face of the ticket.

Figure 3:
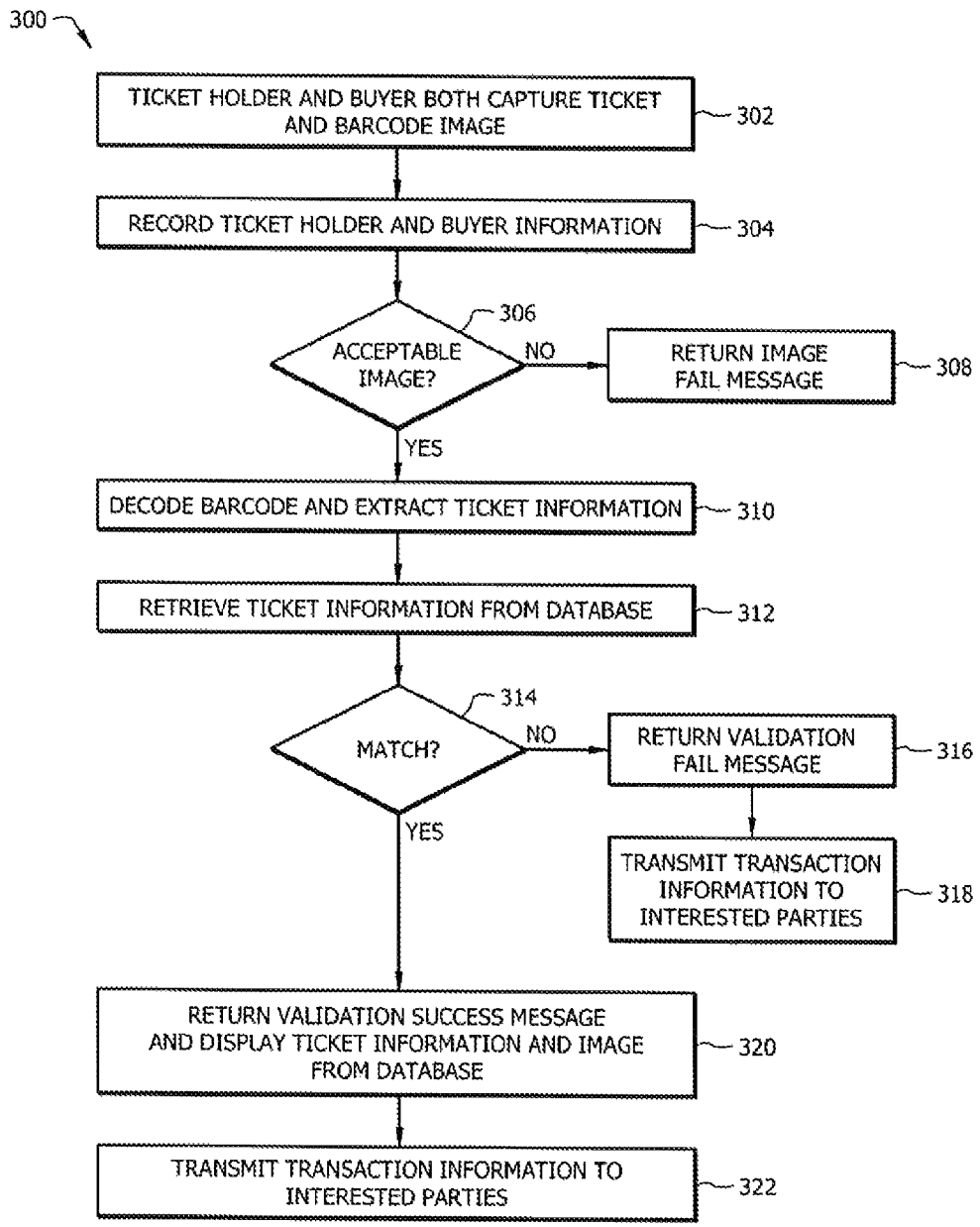
FIG. 3 is a somewhat simplified flow diagram illustrating a method of validating an event ticket in accordance with some embodiments of the present disclosure.

FIG. 3 is a somewhat simplified flow diagram illustrating method 300 of facilitating event ticket validation according to some embodiments of the present disclosure. It should be understood that method 300 shown in FIG. 3 is for illustrative purposes only and that any other suitable method or sub-method could be used in conjunction with or in lieu of method 300 according to some embodiments of the present disclosure. It should also be understood that the steps of method 300 could be performed in any suitable order or manner.

In some embodiments, method 300 may generally be similar to method 200 shown in and described in conjunction with FIG. 2 above (with like operations having similar operations).

In some embodiments, method 300 begins in step 302 with both the ticket holder and the prospective buyer capturing an image of a ticket and its barcode with inquirer 140 using camera 142. The user may then cause inquirer 140 to communicate the image to validation server 120 through communications network 160 using Bluetooth, Wi-Fi, infrared, text message, email, bump technology or by any other suitable manner.

In step 304, validation manager 126 records information related to both the ticket holder and the prospective buyer, such as each party's name, address and phone number.

Validation manager 126 then analyzes the image of the ticket to determine if inquirer 140 has communicated an image containing a barcode that can be decoded, as shown in step 306.

If validation manager 126 determines inquirer 140 has not communicated an image acceptable to decode, the validation server 120 will return an image fail message to inquirer 140 that will be presented to the user through display 144, as shown in step 308.

If validation manager 126 determines inquirer 140 has communicated an image acceptable to decode, the validation manager 126 will decode the barcode of the ticket and extract ticket information, as shown in step 310. Ticket information encoded in the barcode may include the event name, event date, event time, event venue, the section and seat number associated with the ticket, an identifier, other suitable ticket information, or any combination thereof.

In some embodiments, inquirer 140 may itself determine if the image captured in step 302 is acceptable by determining whether the image may be processed to decode the barcode image. If the image is acceptable, inquirer 140 analyzes and decodes the barcode image to extract ticket information, as shown in step 310. For example, responsive to determining that the captured image is acceptable, the image may be processed to decode the barcode image.

In step 312, validation manager 126 retrieves the relevant event ticket information stored in the database 180 that is associated with the ticket in consideration.

In some embodiments, validation manager 126 engages a service to request and receive relevant event ticket information stored in database 180 that is associated with the ticket in consideration. For example, a validation manager 126 may communicate with a third party service that provides valid ticket information. The service (e.g., third party service) may be a ticket source, such as, TicketMaster.com, a ticket printer, a ticket database, a web service for validating tickets, other suitable ticket source, or a combination thereof.

In step 314, validation manager 126 determines if the ticket information encoded in the barcode of the ticket extracted in step 308 matches the event ticket information stored in database 180 retrieved in step 312.

If validation manager 126 determines the information does not match, the validation server 120 will return a validation fail message to inquirer 140 that will be presented to the user through display 144, as shown in step 316.

In step 318, validation server 120 may transmit information related to the parties and the transaction to interested parties 150 that will be presented through display 152.

If validation manager 126 determines that the ticket information encoded in the barcode of the ticket matches the event ticket information stored in database 180, the validation server 120 will return a validation success message to inquirer 140 that will be presented to the user through display 144, as shown in step 320. Validation server 120 may also return event ticket information associated with the ticket, including an image of the view from the seat associated with the ticket. Optionally, an image of a sample event ticket or the actual ticket being considered may be transmitted to inquirer 140 and presented to the user through display 144, for visual verification by the user to confirm the presence of watermarks, holograms, ultraviolet light holograms, ultraviolet ink, micro text, photographic perforation, ghost images, other suitable identifiers, or a combination thereof on the face of the ticket.

In step 322, validation server 120 may transmit information related to the parties and the transaction to interested parties 150 that will be presented through display 152.

Figure 4:
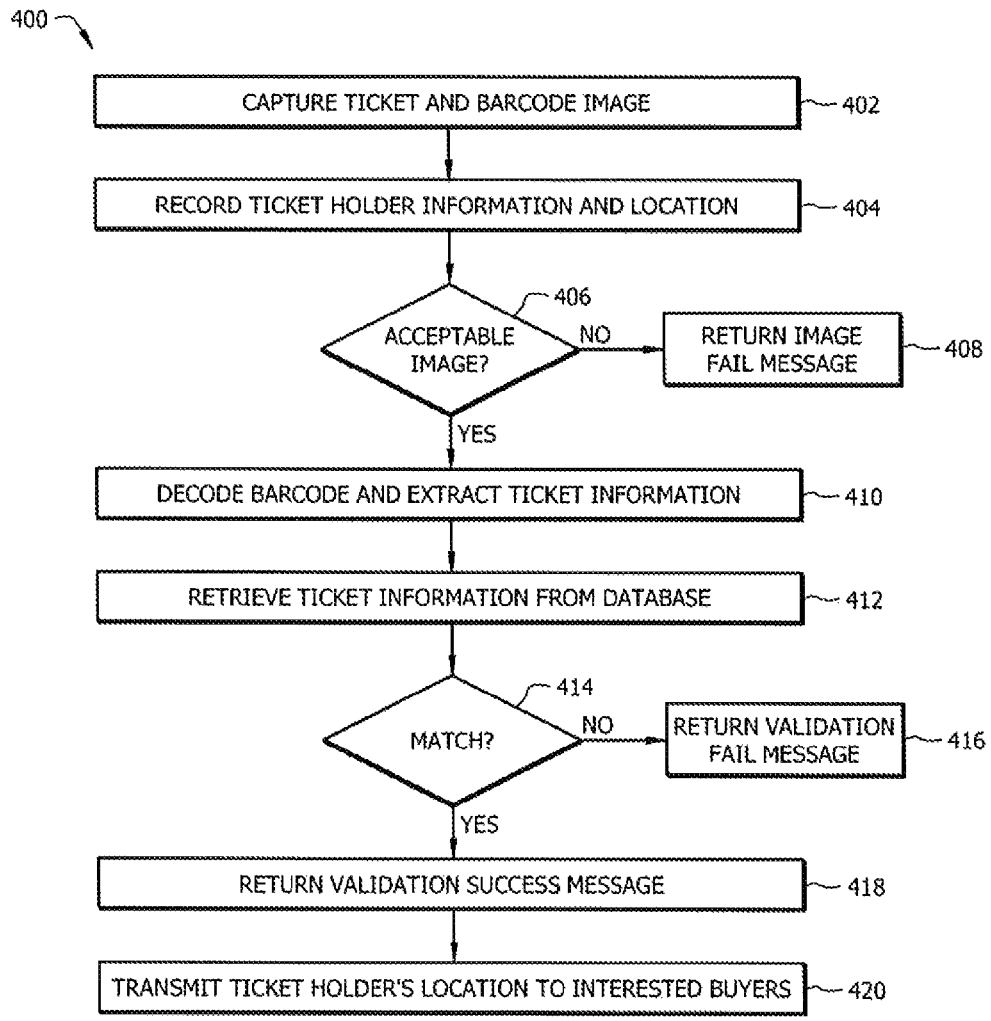
FIG. 4 is a somewhat simplified flow diagram illustrating a method of locating a pre-validated event ticket in accordance with one embodiment of the present disclosure.

FIG. 4 is a somewhat simplified flow diagram illustrating method 400 of facilitating the sale and exchange of pre-validated event tickets according to some embodiments of the present disclosure. It should be understood that method 400 shown in FIG. 4 is for illustrative purposes only and that any other suitable method or sub-method could be used in conjunction with or in lieu of method 400 according to some embodiments of the present disclosure. It should also be understood that the steps of method 400 could be performed in any suitable order or manner.

In some embodiments, method 400 may generally be similar to method 200 shown in and described in conjunction with FIG. 2 above (with like operations having similar operations).

As such, method 400 begins in step 402 with a ticket holder located at a first location capturing an image of a ticket and its barcode with inquirer 140 using camera 142. In some embodiments, the first location may be a site located within a particular distance of the event venue. The ticket holder may be located at another location in other embodiments. The ticket holder may then communicate the image to validation server 120 through communications network 160 using Bluetooth, Wi-Fi, infrared, text message, email, bump technology or by any other suitable manner.

In step 404, validation manager 126 requests from the user and records information related to the ticket holder, such as the ticket holder's name, address, phone number, GPS location, other suitable personally identifiable information, or any combination thereof. In other embodiments, only a subset of the information related to the ticket holder is requested from the user. In such embodiments, some or all of the information related to the ticket holder may be retrieved from inquirer 140 and/or validation manager 126. For example, an account profile stored by validation manager 126 and/or a contact listing in an address book application associated with inquirer 140 may contain a subset or all of the information related to the ticket holder. Inquirer 140 transmits the information related to the ticket holder to validation manager 126.

Validation manager 126 then analyzes the image of the ticket to determine if inquirer 140 has communicated an image containing a barcode that can be decoded, as shown in step 406.

If validation manager 126 determines inquirer 140 has not communicated an image acceptable to decode, the validation server 120 will return an image fail message to inquirer 140 that will be presented to the ticket holder through display 144, as shown in step 408.

If validation manager 126 determines inquirer 140 has communicated an image acceptable to decode, the validation manager 126 will decode the barcode of the ticket and extract ticket information, as shown in step 410. Ticket information encoded in the barcode may include the event name, event date, event time, event venue, and the section and seat number associated with the ticket.

In some embodiments, inquirer 140 may itself determine if the image captured in step 402 is acceptable. If the image is acceptable, inquirer 140 analyzes and decodes the barcode image to extract ticket information, as shown in step 410.

In step 412, validation manager 126 retrieves the relevant event ticket information stored in the database 180 that is associated with the ticket in consideration.

In some embodiments, validation manager 126 engages a service to request and receive relevant event ticket information stored in database 180 that is associated with the ticket in consideration. The service may be a ticket source, such as, TicketMaster.com, a ticket printer, a ticket database, a web service for validating tickets, other suitable ticket source, or a combination thereof.

In step 414, validation manager 126 determines if the ticket information encoded in the barcode of the ticket extracted in step 410 matches the event ticket information stored in database 180 retrieved in step 410.

If validation manager 126 determines the information does not match, the validation server 120 will return a validation fail message to inquirer 140 that will be presented to the ticket holder through display 144, as shown in step 416.

If validation manager 126 determines that the ticket information encoded in the barcode of the ticket matches the event ticket information stored in database 180, the validation server 120 will return a validation success message to inquirer 140 that will be presented to the ticket holder through display 144, as shown in step 418.

In step 420, validation server 120 transmits information related to the ticket holder, the ticket holder's location, and the number of available, pre-validated tickets that the ticket holder has to interested buyers seeking legitimate event tickets.

Validation server 120 may allow interested buyers to browse all of the available, pre-validated tickets to select a desired ticket section, seat number and/or price. When an interested buyer selects a desired ticket section, seat number, and/or price the system may direct the interested buyer to the sellers holding tickets meeting the interested buyer's criteria. In some embodiments, validation server 120 may direct the interested buyer to the location of the sellers holding tickets meeting the interested buyer's criteria on a map of the venue. In some embodiments, validation server 120 may provide the interested buyer with a status of the seller's rating, based on how many favorable and/or unfavorable ticket validations with which the seller has been associated. Examples of statuses the validation server 120 may provide may include "positive," "suspect," "blacklisted," or unknown.

In some embodiments, validation server 120 retrieves ticket information for available tickets responsive to a user input. The user input may include a desired event, date, time, seat section, seat row, seat number, price, price range, other suitable criteria, or a combination thereof.

In some embodiments, the user may cause inquirer 140 to request to be notified when one or more tickets become available for purchase that meet user-specified criteria. In such an embodiment, validation server 120 may send notifications to inquirer 140 in the form of e-mail, push notifications, text messages, other suitable notifications, or any combination thereof. For example, a user may cause inquirer 140 to request to be notified when tickets in a particular price range and/or section for a particular event become available for purchase In some embodiments, the user may request a location-based search. The validation server 120 may then retrieve all of the events occurring around a specific location during a user-specified number of days.

The validation server 120 may then retrieve the ticket information of available tickets that matches the criteria specified by the user.

In some embodiments, the validation server 120 may then generate a user interface for the purchase of tickets to inquirer 140 that will be presented to the user through display 144. The user may then select one or more listings in the user interface for purchase.

In some embodiments, the validation server 120 presents a payment authorization interface. The payment authorization interface requests payment information, such as credit card information from the user. Validation server 120 may store the payment information for future purchases, associate such information with a user account of the user, and not request such information when the user makes a subsequent purchase.

Additionally, system 100 may allow companies to create corporate accounts to pre-validate tickets, as described in method 400. These companies may then designate certain sellers to sell event tickets through the company's corporate account. When an interested buyer requests tickets from a specified company, the system may direct the interested buyer to the company's designated sellers, located near the event venue in some embodiments, using GPS coordinates, local positioning system coordinates, signal triangulation, another suitable location system, or any combination thereof.

Figure 5:
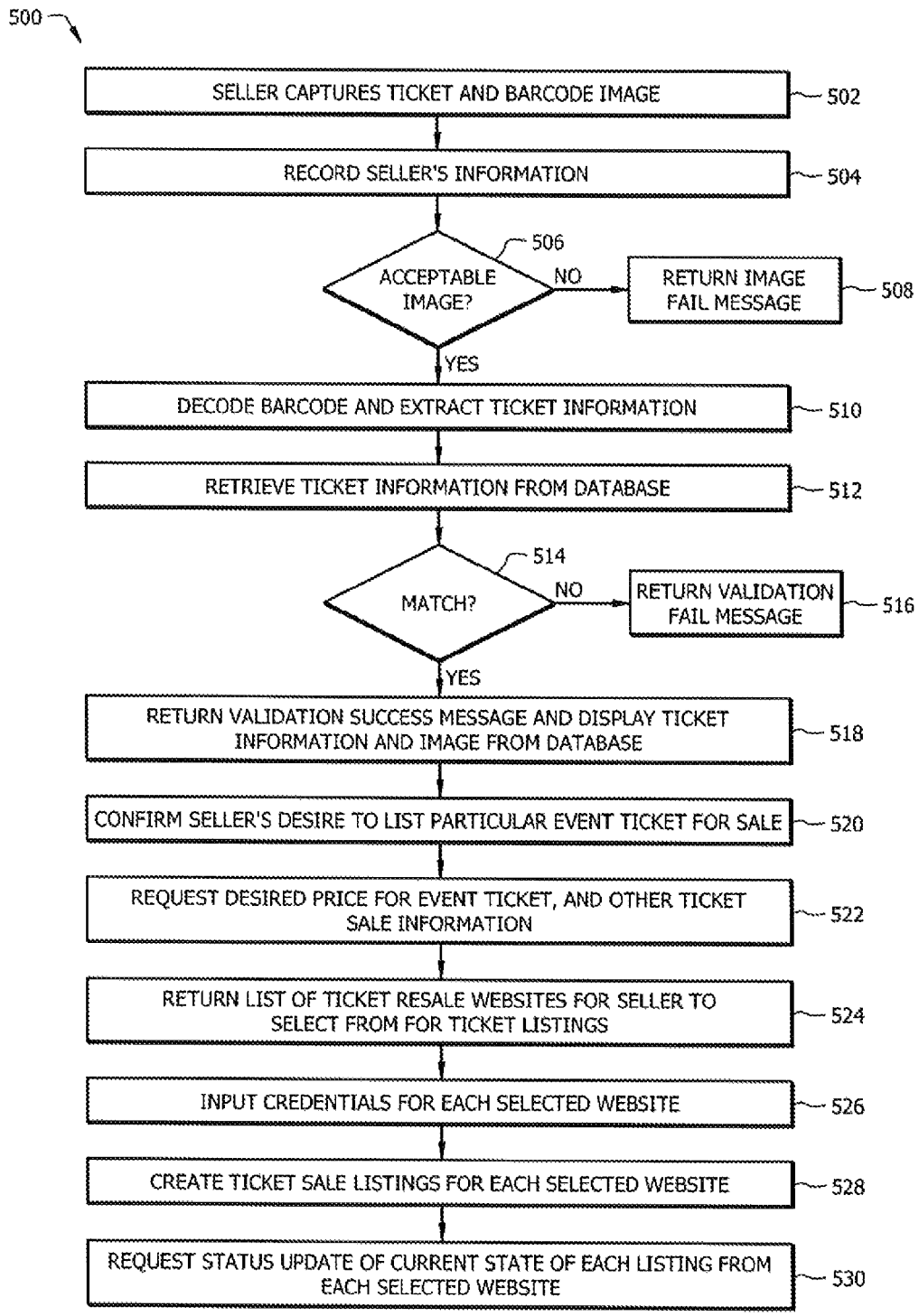
FIG. 5 is a somewhat simplified flow diagram illustrating a method of validating an event ticket and allowing a seller to easily manage the seller's event tickets sale listings on external ticket sale websites in accordance with one embodiment of the present disclosure.

FIG. 5 is a somewhat simplified flow diagram illustrating method 500 of facilitating event ticket validation, while allowing a seller to easily manage the seller's event tickets sale listings on external ticket sale websites according to some embodiments of the present disclosure. It should be understood that method 500 shown in FIG. 5 is for illustrative purposes only and that any other suitable method or sub-method could be used in conjunction with or in lieu of method 500 according to some embodiments of the present disclosure. It should also be understood that the steps of method 500 could be performed in any suitable order or manner.

In some embodiments, method 500 may generally be similar to method 200 shown in and described in conjunction with FIG. 2 above (with like operations having similar operations).

In some embodiments of the present disclosure, validation manager 126 may also manage a seller's event tickets sale listings on external ticket sale websites.

For example, a seller may be in possession of event tickets that the seller desires to sell. Typically the seller may list such tickets for sale on various websites, such as, for example, StubHub.com, RazorGator.com, SeatGeek.com, VividSeats.com, TicketMaster.com and TicketXchange.com.

Currently, a seller individually lists each event ticket for sale on each website, and may manage multiple listings on multiple websites. After the sale of a particular event ticket, the seller then removes the listing from all of the other websites where the event ticket is listed.

In some embodiments, method 500 begins in step 502 with the seller capturing an image of each ticket and its barcode with inquirer 140 using camera 142. The seller may then communicate the image of each ticket one at a time or in batches to the validation server 120 through communications network 160 using Bluetooth, Wi-Fi, infrared, text message, email, bump technology or by any other suitable manner.

In step 504, validation manager 126 records information related to the seller, such as the seller's name, address and phone number. Validation manager 126 may also record an identifier associated with inquirer 140. For example, validation manager 126 may request and/or record a universally unique identifier (UUID), an electronic serial number (ESN), an international mobile equipment identity (IMEI), another suitable identifier, or any combination thereof.

Validation manager 126 then analyzes the barcode of each ticket to determine if inquirer 140 has communicated an image that can be decoded, as shown in step 506.

If validation manager 126 determines inquirer 140 has not communicated an image acceptable to decode, the validation server 120 will return an image fail message to inquirer 140 that will be presented to the seller through display 144, as shown in step 508.

If validation manager 126 determines inquirer 140 has communicated an image acceptable to decode, the validation manager 126 will decode the barcode of the ticket and extract ticket information, as shown in step 510. Ticket information encoded in the barcode may include the event name, event date, event time, event venue, the section and seat number associated with the ticket, other suitable ticket information, or any combination thereof.

In some embodiments, inquirer 140 may itself determine if the image captured in step 502 is acceptable. If the image is acceptable, inquirer 140 analyzes and decodes the barcode image to extract ticket information, as shown in step 510.

In step 512, validation manager 126 retrieves the relevant event ticket information stored in the database 180 that is associated with the ticket in consideration.

In some embodiments, validation manager 126 engages a service to request and receive relevant event ticket information stored in database 180 that is associated with the ticket in consideration. The service may be a ticket source, such as, TicketMaster.com, a ticket printer, a ticket database, a web service for validating tickets, other suitable ticket source, or a combination thereof.

In step 514, validation manager 126 determines if the ticket information encoded in the barcode of the ticket extracted in step 510 matches the event ticket information stored in database 180 retrieved in step 512.

If validation manager 126 determines the information does not match, the validation server 120 will return a validation fail message to inquirer 140 that will be presented to the seller through display 144, as shown in step 516.

If validation manager 126 determines that the ticket information encoded in the barcode of the ticket matches the event ticket information stored in database 180, the validation server 120 will return a validation success message to inquirer 140 that will be presented to the seller through display 144, as shown in step 518.

Validation server 120 may then send the ticket information for each event ticket to the seller to confirm that the seller desires to list the particular event ticket for sale, as shown in step 520.

In step 522, if the seller confirms the seller's desire to list the event ticket for sale, validation server 120 may request the seller to enter a desired price for the event ticket, whether multiple tickets are to be sold only in pairs, other suitable event ticket sale requirements, or a combination thereof.

In some embodiments, validation server 120 may generate one or more pricing suggestions for the event ticket to inquirer 140 that will be presented to the seller through display 144. The validation server 120 may generate the suggestions based on retrieving average sale price information for tickets from the ticket resale websites, other databases, or a combination thereof. The suggestions may also be based on historical ticket sales information.

In step 524, the validation server 120 may then return a list of websites where the seller may list the event ticket to inquirer 140 that will be presented to the seller through display 144. The seller may select one or more of the presented websites, enter one or more websites not presented, or a combination thereof.

In some embodiments, the websites may be ticket resale websites and/or classified websites with which the validation server 120 may communicate without human interaction, such as using an application programming interface (API). For example, the validation server 120 may automatically list one or more of the tickets for sale on the website(s). In some embodiments, the validation server 120 is configured to communicate with websites by receiving web content from the websites and simulating user interaction with the components in the web content, based on known locations of data within the web content (e.g. screen scraping). Other appropriate methods of interacting with a website may be used.

In step 526, the validation server 120 may request credentials for each selected website from the seller, such as a user name and a password associated with each particular website. In other embodiments, validation server 120 may authenticate the user with respect to the selected website using a token-based authentication scheme. A token-based authentication scheme is an authentication scheme in which a server authenticates a user by referring the inquirer to an authentication source with which the user has an account. The server may also include a token or an identifier with the referral to the authentication source. When the user successfully authenticates with the authentication the source using the inquirer, the authentication source returns a token to the inquirer that is provided to the server as an assertion that the authentication occurred. For example, an authentication scheme such as OpenID may be used. Other suitable authentication schemes may also be used.

In some embodiments, validation server 120 may store the seller's credentials for a plurality of websites for ease. In such embodiments, the seller is not prompted to enter the seller's credentials during subsequent ticket sale listings.

In some embodiments, validation server 120 may communicate with the selected websites by using credentials associated with validation server 120. In other words, the validation server 120 has credentials associated with validation server 120 for each website. The validation server 120 may create a plurality of listings for the event tickets of a plurality of users using a single set of credentials.

Validation server 120 may then automatically create a ticket sale listing on each of the selected websites and automatically populate the ticket sale listing fields using the extracted ticket information extracted in step 510, as shown in step 528.

The validation server 120 may generate requests to create a listing using the API that is associated with a particular website. After creating the listing, the validation server 120 may receive results of the listing creation from the websites. For example, a first website may return results that the listing was successfully created with an identifier for the listing, while a second website may return results that the listing could not be created because the credentials provided by the user were not valid. The results may be returned to inquirer 140.

In step 530, the validation server 120 may request a status of the current state of each of the listings from the selected websites. The status requests may be on a periodic basis, upon receiving a status request from the seller, or a combination thereof.

The current state of each of the listings may include whether the listing is active, the expiration date of the listing, the number of unique views of the listing, an indication that the price of the listing is more than a threshold amount above or below the average price of comparable tickets for the event, other suitable information, or a combination thereof.

In some embodiments, after an event ticket has been sold on any of the websites, validation server 120 may automatically remove the listing from the other selected websites.

Additionally, validation server 120 may present a dashboard to the seller. A dashboard is a user interface that presents the status of the listings created by the validation server 120 for the seller. The dashboard may present information about each of the event tickets that have active listings, the particular websites on which the event tickets are listed, other suitable information, or a combination thereof.

In some embodiments, the seller may activate user interface controls from the dashboard that perform various functions. For example, the seller may activate a control that causes the validation server 120 to update the status of the ticket listings on one or more of the selected websites. The seller may also activate a user interface control that causes the validation server 120 to cancel one or more listings, change a price of one or more listings, or create listings for the same tickets on additional websites.

Additionally, the validation server 120 is configured to receive requests to be notified of the occurrence of particular events related to ticket listings created for the seller. For example, the validation server 120 may receive a notification that the seller desires to be notified when one or more tickets in the listing have been sold. The validation server 120 may also receive a notification that the seller desires to be notified when a particular number of seats listed for sale by other sellers in the section corresponding to the tickets listed for sale by the seller are remaining. Such notification may be particular to one or more websites. The notification may be based on percentage change or other criteria in other embodiments. Further, the notification may be for a plurality of tickets on a plurality of websites.

In some embodiments, validation server 120 may allow interested buyers to browse, locate and purchase available tickets.

In some embodiments, validation server 120 retrieves ticket information for available tickets responsive to a user input. The user input may include a desired event, date, time, seat section, seat row, seat number, price, price range, other suitable criteria, or a combination thereof. The validation server 120 may then retrieve the ticket information of available tickets that matches the criteria specified by the user. Validation server 120 retrieves the ticket information of available tickets by searching data stores containing listings created by validation server 120, as well as a plurality of websites. The validation server 120 may query the plurality of websites using an API, or other suitable query.

In some embodiments, the validation server 120 may then generate a user interface for the purchase of tickets to inquirer 140 that will be presented to the user through display 144. The user may then select one or more listings in the user interface for purchase.

In some embodiments, the validation server 120 may begin generating the user interface prior to completing one or more queries. For example, the user interface may be presented to the user with an indication that some websites have not yet been queried. When such queries are complete, the user interface is updated without user interaction.

In some embodiments, the validation server 120 presents a payment authorization interface. The payment authorization interface requests payment information, such as credit card information from the user. Validation server 120 may store the payment information for future purchases, associate such information with a user account of the user, and not request such information when the user makes a subsequent purchase.

In other embodiments, validation server 120 redirects the user to the website associated with the listing selected by the user. In such embodiments, the validation server 120 may send information to the website, such as an identifier for the listing selected by the user. The website then sends a request for payment information to the user, and the transaction is processed by the website.

Figure 6:
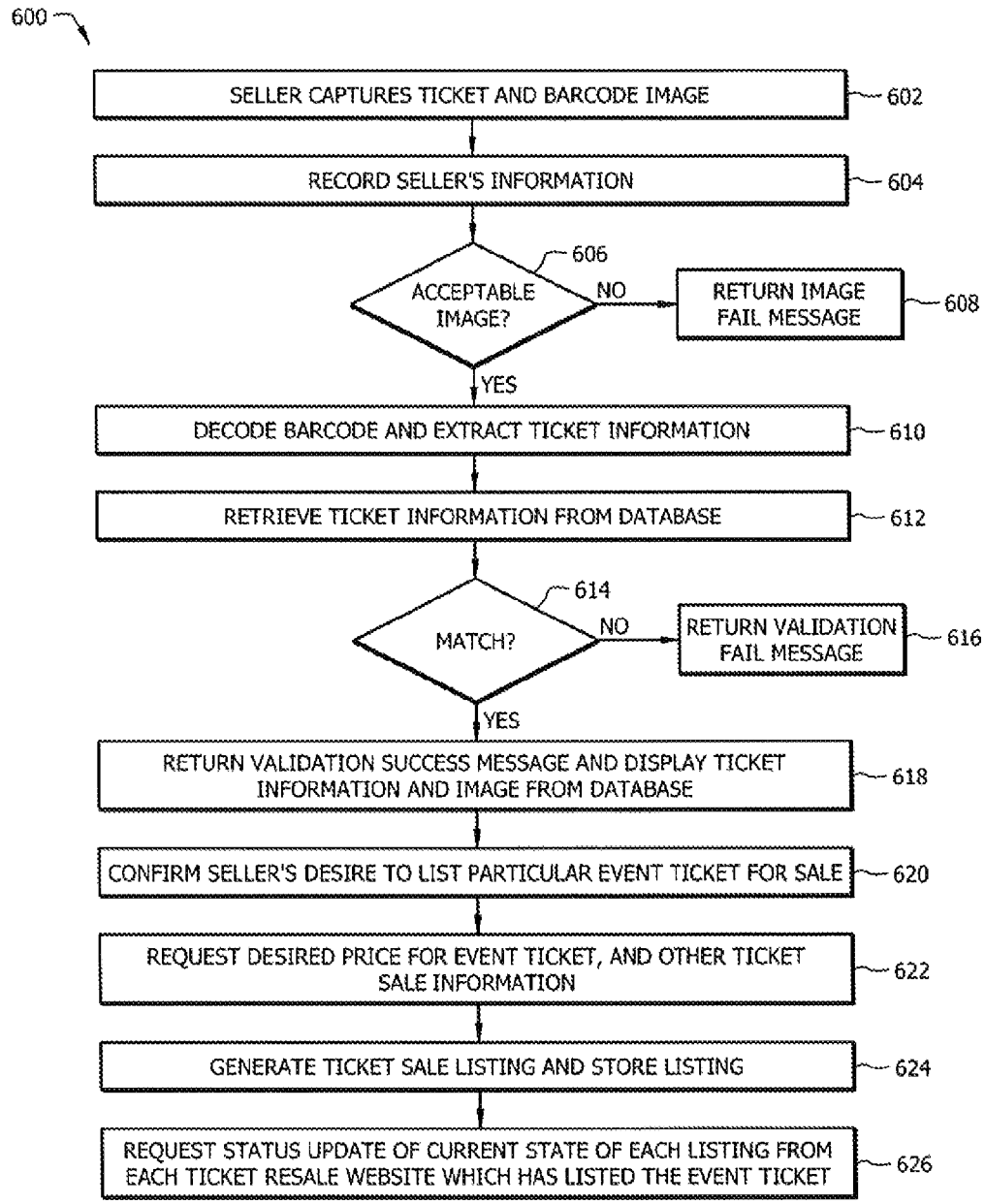
FIG. 6 is a somewhat simplified flow diagram illustrating a method of validating an event ticket and allowing a seller to easily manage the seller's event tickets sale listings on external ticket sale websites in accordance with some embodiments of the present disclosure.

FIG. 6 is a somewhat simplified flow diagram illustrating method 600 of facilitating event ticket validation, while allowing a seller to easily manage the seller's event tickets sale listings on external ticket sale websites according to some embodiments of the present disclosure. It should be understood that method 600 shown in FIG. 6 is for illustrative purposes only and that any other suitable method or sub-method could be used in conjunction with or in lieu of method 600 according to some embodiments of the present disclosure. It should also be understood that the steps of method 600 could be performed in any suitable order or manner.

In some embodiments, method 600 may generally be similar to method 500 shown in and described in conjunction with FIG. 5 above (with like operations having similar operations).

In some embodiments, method 600 begins in step 602 with the seller capturing an image of each ticket and its barcode with inquirer 140 using camera 142. The seller may then communicate the image of each ticket one at a time to the validation server 120 through communications network 160 using Bluetooth, Wi-Fi, infrared, text message, email, bump technology or by any other suitable manner.

In step 604, validation manager 126 records information related to the seller, such as the seller's name, address and phone number.

Validation manager 126 then analyzes the barcode of each ticket to determine if inquirer 140 has communicated an image that can be decoded, as shown in step 606.

If validation manager 126 determines inquirer 140 has not communicated an image acceptable to decode, the validation server 120 will return an image fail message to inquirer 140 that will be presented to the seller through display 144, as shown in step 608.

If validation manager 126 determines inquirer 140 has communicated an image acceptable to decode, the validation manager 126 will decode the barcode of the ticket and extract ticket information, as shown in step 610. Ticket information encoded in the barcode may include the event name, event date, event time, event venue, the section and seat number associated with the ticket, other suitable ticket information, or any combination thereof.

In some embodiments, inquirer 140 may itself determine if the image captured in step 602 is acceptable. If the image is acceptable, inquirer 140 analyzes and decodes the barcode image to extract ticket information, as shown in step 610.

In step 612, validation manager 126 retrieves the relevant event ticket information stored in the database 180 that is associated with the ticket in consideration.

In some embodiments, validation manager 126 engages a service to request and receive relevant event ticket information stored in database 180 that is associated with the ticket in consideration. The service may be a ticket source, such as, TicketMaster.com, a ticket printer, a ticket database, a web service for validating tickets, other suitable ticket source, or a combination thereof.

In step 614, validation manager 126 determines if the ticket information encoded in the barcode of the ticket extracted in step 610 matches the event ticket information stored in database 180 retrieved in step 612.

If validation manager 126 determines the information does not match, the validation server 120 will return a validation fail message to inquirer 140 that will be presented to the seller through display 144, as shown in step 616.

If validation manager 126 determines that the ticket information encoded in the barcode of the ticket matches the event ticket information stored in database 180, the validation server 120 will return a validation success message to inquirer 140 that will be presented to the seller through display 144, as shown in step 618.

Validation server 120 may then send the ticket information for each event ticket to the seller to confirm that the seller desires to list the particular event ticket for sale, as shown in step 620.

In step 622, if the seller confirms the seller's desire to list the event ticket for sale, validation server 120 may request the seller to enter a desired price for the event ticket, whether multiple tickets are to be sold only in pairs, other suitable event ticket sale requirements, or a combination thereof.

In some embodiments, validation server 120 may generate one or more pricing suggestions for the event ticket to inquirer 140 that will be presented to the seller through display 144. The validation server 120 may generate the suggestions based on retrieving average sale price information for tickets from ticket resale websites, other databases, or a combination thereof. The suggestions may also be based on historical ticket sales information.

In step 624, the validation server 120 may generate a ticket sale listing using the extracted ticket information extracted in step 610 and stores the listing.

Ticket sale listings stored on validation server 120 may be available to ticket resale websites and/or classified websites. The websites may communicate with validation server 120 and request event tickets available for sale.

Any of the websites may then attempt to sell the listed tickets on its website. In the event that the website sells a listed ticket, the website may then report such sale to the validation server 120.

In some embodiments, the report includes payment information that is processed by the validation server 120. In some embodiments, the report includes an identifier for a separate payment processing system trusted by the validation server 120 indicating that the payment has been completed. The validation server 120 may then deactivate the listing. In some embodiments, the validation server 120 may also communicate the deactivation to other websites that have listed the tickets.

In step 626, the validation server 120 may request a status of the current state of each of the listings from the websites that have listed the ticket. The status requests may be on a periodic basis, upon receiving a status request from the seller, or a combination thereof.

The current state of each of the listings may include whether the listing is active, the expiration date of the listing, the number of unique views of the listing, an indication that the price of the listing is more than a threshold amount above or below the average price of comparable tickets for the event, other suitable information, or a combination thereof.

Additionally, validation server 120 may present a dashboard to the seller. A dashboard is a user interface that presents the status of the listings created by the validation server 120 for the seller. The dashboard may present information about each of the event tickets that have active listings, the particular websites on which the event tickets are listed, other suitable information, or a combination thereof.

In some embodiments, the seller may activate user interface controls from the dashboard that perform various functions. For example, the seller may activate a control that causes the validation server 120 to update the status of the ticket listings on one or more of the websites. The seller may also activate a user interface control that causes the validation server 120 to change the ticket price.

Additionally, the validation server 120 is configured to receive requests to be notified of the occurrence of particular events related to ticket listings created for the seller. For example, the validation server 120 may receive a notification that the seller desires to be notified when one or more tickets in the listing have been sold. The validation server 120 may also receive a notification that the seller desires to be notified when a particular number of seats listed for sale by other sellers in the section corresponding to the tickets listed for sale by the seller are remaining. Such notification may be particular to one or more websites. The notification may be based on percentage change or other criteria in other embodiments. Further, the notification may be for a plurality of tickets on a plurality of websites.

In some embodiments, validation server 120 may allow interested buyers to browse, locate and purchase available, pre-validated tickets. Pre-validated tickets are tickets that have been submitted by an inquirer, such as inquirer 140, processed by validation server 120, and for which a validation success message was returned to the inquirer.

In some embodiments, validation server 120 retrieves ticket information for available, pre-validated tickets responsive to a user input. The user input may include a desired event, date, time, seat section, seat row, seat number, price, price range, other suitable criteria, or a combination thereof. The validation server 120 may then retrieve the ticket information of available tickets that matches the criteria specified by the user. Validation server 120 retrieves the ticket information of available tickets by searching data stores containing listings created by validation server 120, as well as a plurality of websites. The validation server may query the plurality of websites using an API, or other suitable query.

In some embodiments, the validation server 120 may then generate a user interface for the purchase of tickets to inquirer 140 that will be presented to the user through display 144. The user may then select one or more listings in the user interface for purchase.

In some embodiments, the validation server 120 may begin generating the user interface prior to completing one or more queries. For example, the user interface may be presented to the user with an indication that some websites have not yet been queried. When such queries are complete, the user interface is updated without user interaction.

In some embodiments, the validation server 120 presents a payment authorization interface. The payment authorization interface requests payment information, such as credit card information from the user. Validation server 120 may store the payment information for future purchases, associate such information with a user account of the user, and not request such information when the user makes a subsequent purchase.

In other embodiments, validation server 120 redirects the user to the website associated with the listing selected by the user. In such embodiments, the validation server 120 may send information to the website, such as an identifier for the listing selected by the user. The website then sends a request for payment information to the user, and the transaction is processed by the website.

Figure 7:
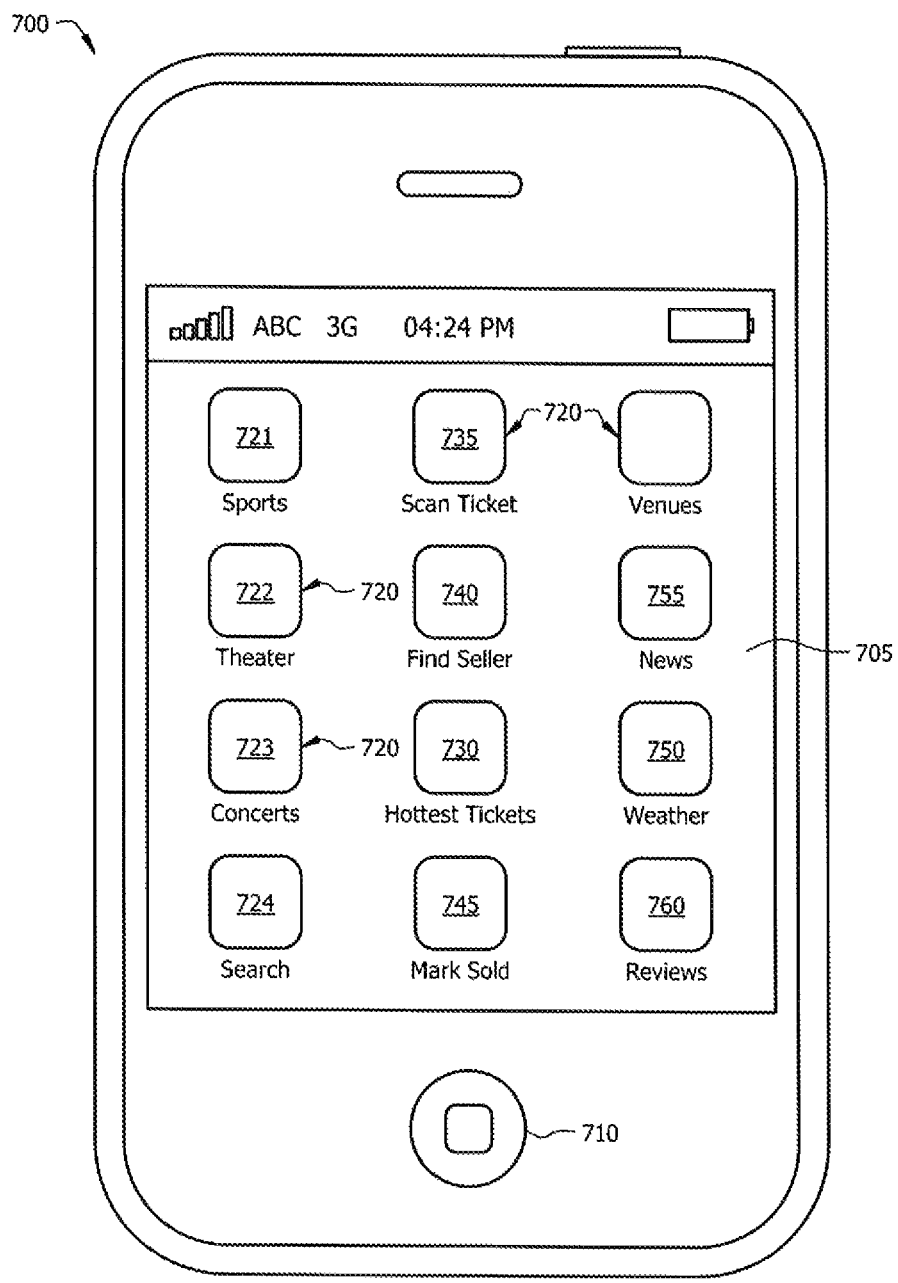
FIG. 7 generally illustrates an inquirer of system 100 of FIG. 1 according to one embodiment of the present disclosure, which a user may employ to communicate and interact with system 100.

FIG. 7 generally illustrates an inquirer 700, which may be an embodiment of the inquirer 140 described in system 100 of FIG. 1 some embodiments, which a user may employ to communicate and interact with validation server 120. It should be understood that inquirer 700 shown in FIG. 7 is for illustrative purposes only and that any other suitable devices could be used in conjunction with or in lieu of inquirer 700 according to some embodiments of the present disclosure.

Inquirer 700 may generally comprise camera, display and input device(s). As illustrated, the inquirer 700 may include a touch screen 705 that operates as a display and input device. The inquirer 700 may include one or more additional input devices 710 (e.g., button and/or keys), in some embodiments. In some embodiments, display may show a home screen, which acts as the central user control for system 100. In some embodiments, the home screen may include quick filter category buttons 720, such as Sports 721, Theater 722 and Concerts 723. When the user selects one of these buttons, inquirer 700 is taken to a filtered search for upcoming events related to the selected category. In some embodiments, the user may cause inquirer 700 to further refine the search by limiting the location, date, time, or other suitable fields.

In some embodiments, a Hottest Tickets button 730 may be presented to the user on the home screen. The Hottest Ticket button may allow the user to find the most popular tickets, defined as the events that are most frequently searched, purchased, and/or accessed by users of the validation server 120, for a particular location, date, time, artist, or other suitable fields.

In other embodiments, other buttons may be included on the home screen, such as a generic search button 724 allowing a user to input desired search criteria.

In some embodiments, the home screen may also present the user with buttons to initiate the ticket validation system methods as described herein, such as Scan Tickets 735, Find Sellers 740 and Mark Sold 745. The Scan Ticket button engages the camera of the inquirer 700 to capture the barcode to be validated. The Find Seller button 740 locates ticket holders with available, pre-validated tickets nearest to the user and depicts these sellers on a map in relationship to the location of the user. The Mark Sold button 745 invokes the validation server 120 to remove a listing of the ticket from the various websites and/or the ticket database 180. The Mark Sold button 745 may be used when the user has sold the tickets outside of the ticket validation system 120, or no longer desires to sell one or more tickets.

In some embodiments, the home screen may also allow the user to access other information related to an event or location, such as Weather 750, News 755, and Reviews 760.

It should be understood that the home screen displayed in FIG. 7 is for illustrative purposes only, and any other suitable display, with or without any suitable combination of filter buttons, could be used in conjunction with or in lieu of the home screen according to some embodiments of the present disclosure.

Figure 8:
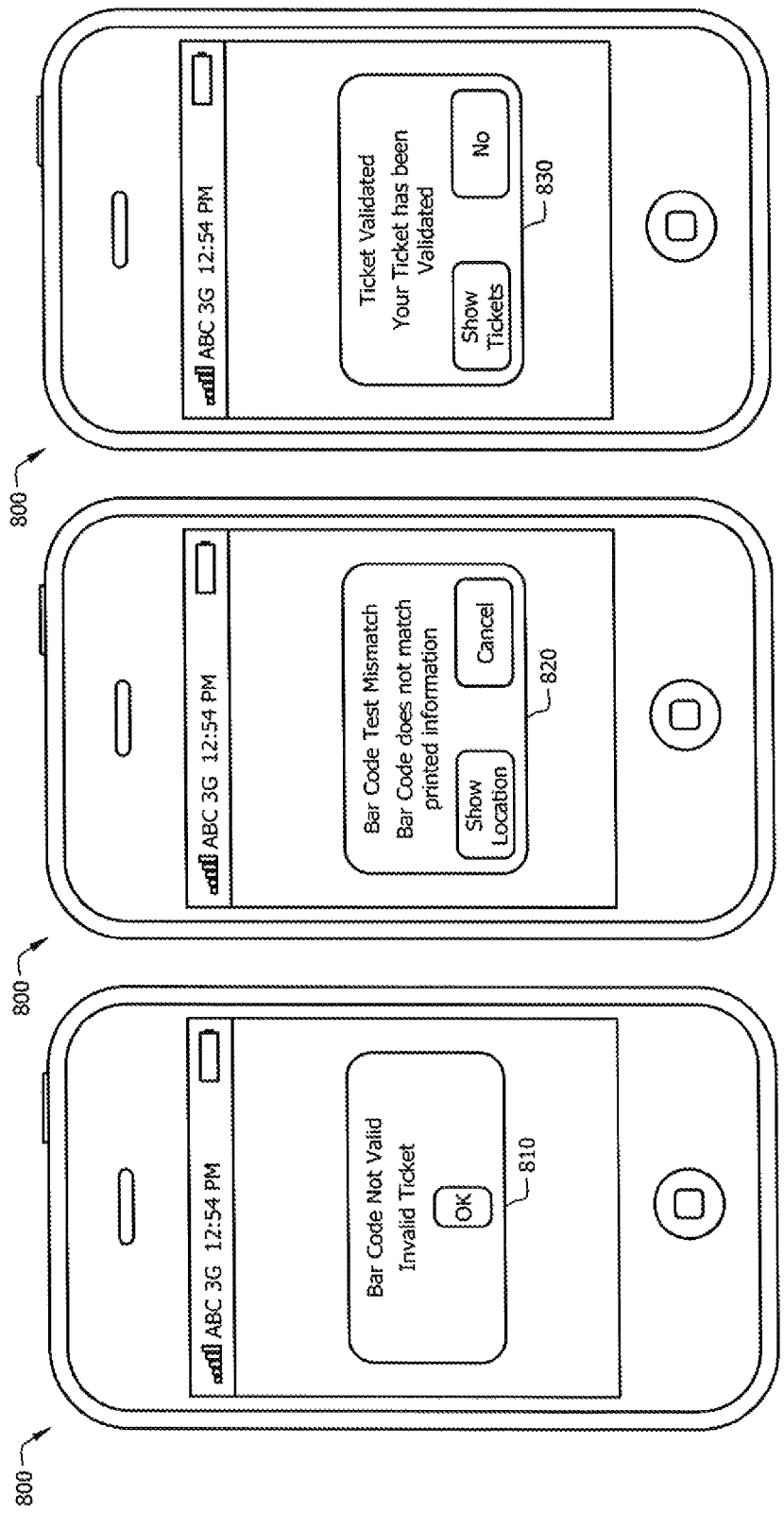
FIG. 8A illustrates one example of a message that system 100 may present to the user if a barcode scan was unsuccessful according to one embodiment of the present disclosure.
FIG. 8B illustrates one example of a message that system 100 may present to the user if a ticket validation was unsuccessful according to one embodiment of the present disclosure.
FIG. 8C illustrates one example of a message that system 100 may present to the user if a ticket validation was successful according to one embodiment of the present disclosure.

FIGS. 8A, 8B and 8C depict messages that may be presented to the user through display of the inquirer 800 after the user captures an image of a ticket and its barcode. FIG. 8A illustrates one example of a message 810 that may be presented to the user if the barcode scan was unsuccessful according to some embodiments. If the barcode scans valid, then validation server 120 may retrieve the ticket information from the ticket database 180 to allow for the comparison of the ticket information decoded from the ticket barcode. FIG. 8b illustrates one example of a message 820 that may be presented to the user if the ticket information retrieved from the ticket database 180 does not match the ticket information decoded from the barcode according to some embodiments. FIG. 8c illustrates one example of a message 830 that may be presented to the user if the ticket information retrieved from the ticket database 180 matches the ticket information decoded from the barcode, and the validation is successful according to some embodiments. It should be understood that the messages depicted in FIGS. 8A-C are for illustrative purposes only and that any suitable message may be used in conjunction with or in lieu of these messages according to some embodiments of the present disclosure.

Figure 9:
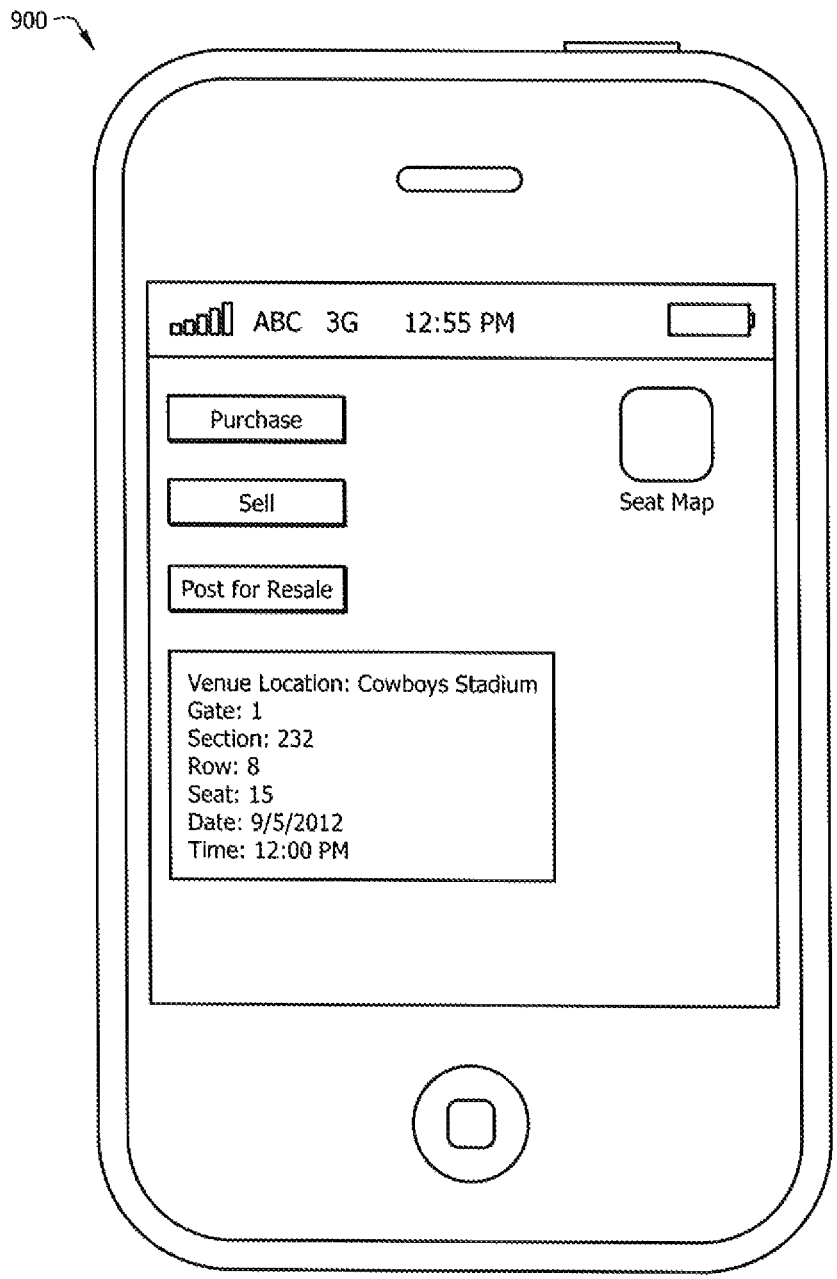
FIG. 9 generally illustrates results corresponding to a ticket scan according to one embodiment of the present disclosure.

FIG. 9 generally illustrates results, displayed on an inquirer 900, corresponding to a ticket scan according to some embodiments. In some embodiments, validation server 120 presents the user the opportunity to purchase the validated ticket, sell the ticket to an interested buyer, or post the ticket on a ticket resale website or classified website via one or more portions of the user interface (e.g., purchase, sell, and/or post buttons).

Figure 10:
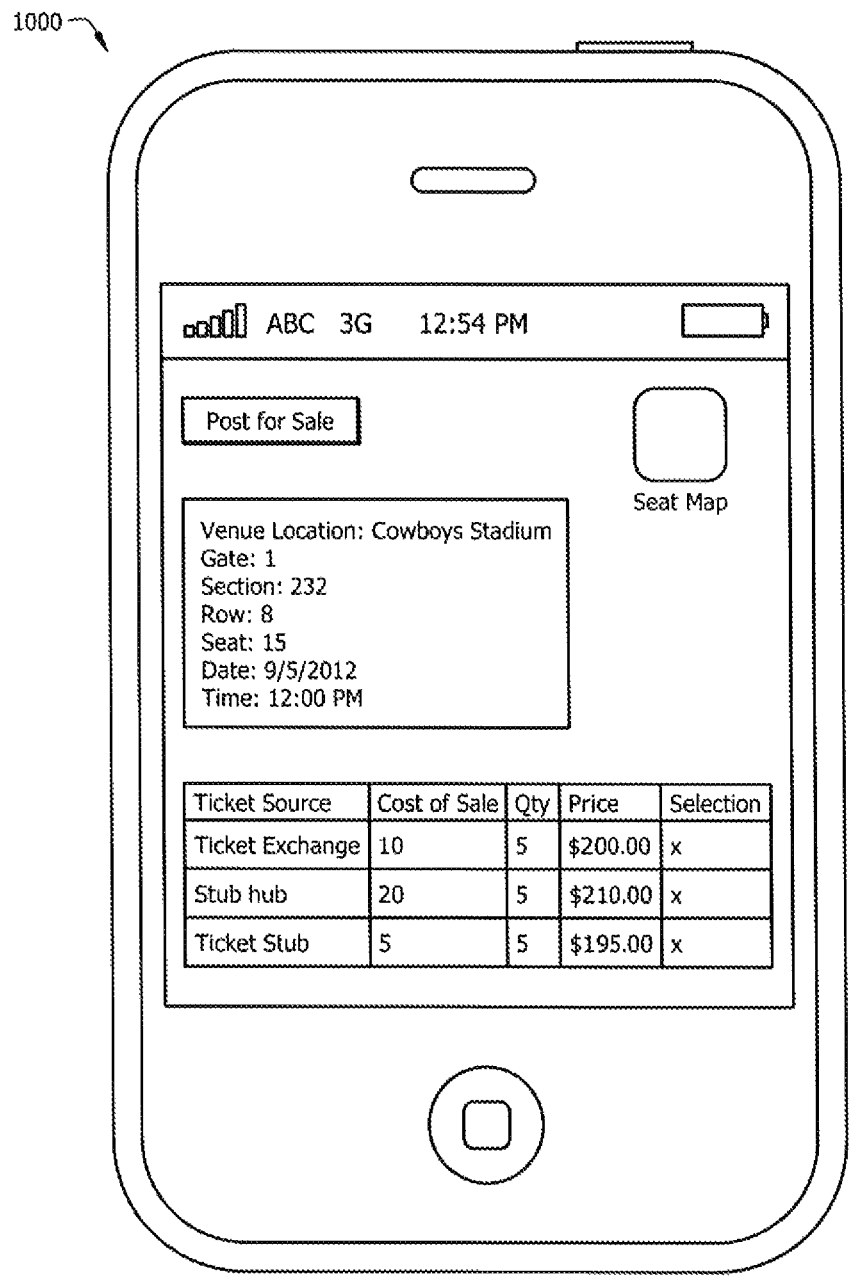
FIG. 10 generally illustrates system 100 facilitating posting validated tickets on external websites for sale according to one embodiment of the present disclosure.

If the user selects to post the ticket on a ticket resale website or classified website, the validation server 120 may present, on a display of the inquirer 1000, to the user further options, as illustrated in FIG. 10. In some embodiments, the user may select particular websites to post the ticket listing, the number of tickets to be sold, and the price of each ticket.

Figure 11:
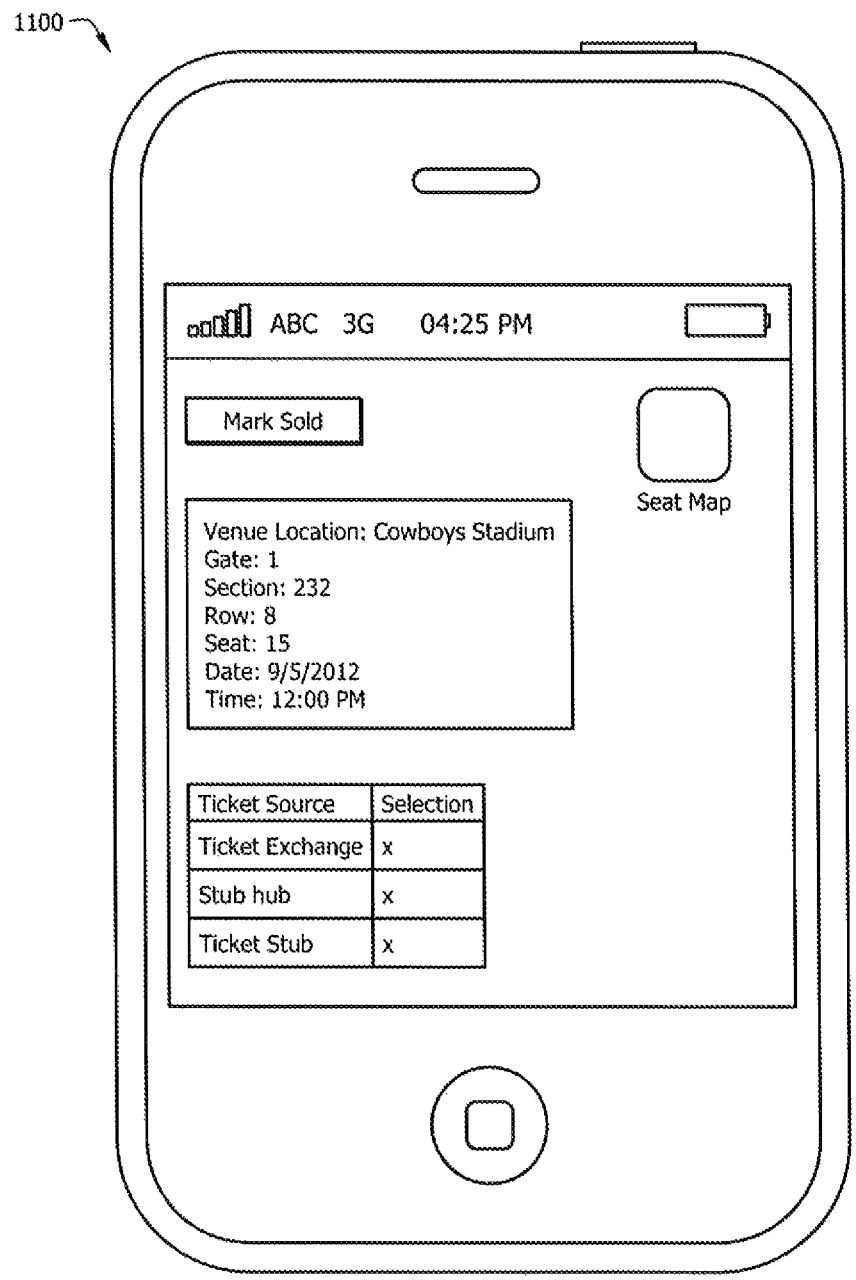
FIG. 11 generally illustrates system 100 facilitating the removal of sold tickets from external websites according to one embodiment of the present disclosure.

In some embodiments, if a ticket is sold, validation server 120 may present, on the inquirer 1100, to the user the option to remove the listing from other websites and the ticket database 180 and/or mark the ticket as sold, as shown in FIG. 11.

Figure 12:
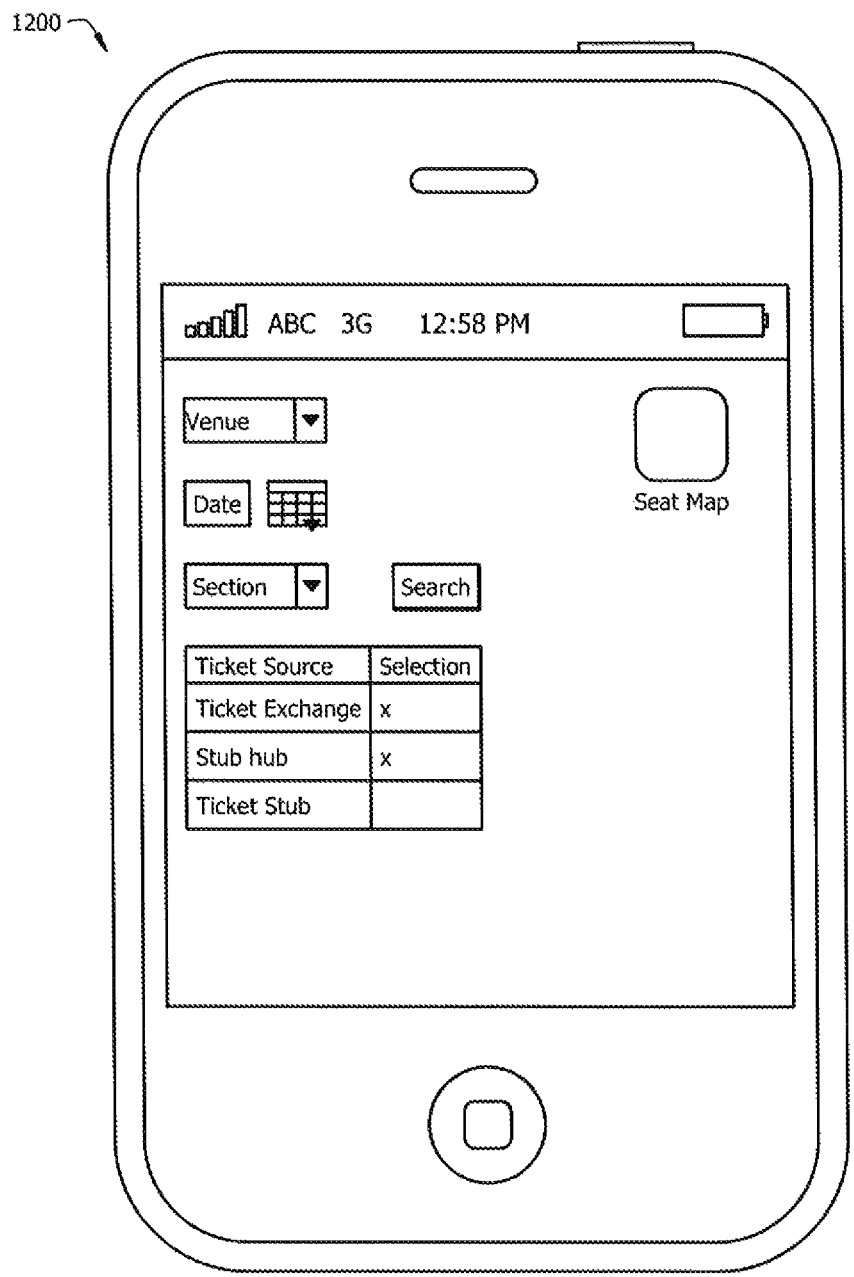
FIG. 12 generally illustrates system 100 facilitating a ticket exchange by searching external websites for available tickets around a user-specified location during a user-specified time period according to one embodiment of the present disclosure.

FIG. 12 generally illustrates an embodiment of the system 100 facilitating a ticket exchange by searching external websites for available tickets around a user-specified location during a user-specified time period some embodiments, which is presented through a user interface on the inquirer 1200. In some embodiments, system 100 may allow the user to select one or more external websites for a specific event. In other embodiments, system 100 may allow the user to select one or more external websites for all events in a specified radius for a specified time period. For example, the user may select to search for all events in the user's surrounding area for the next five days.

Figure 13:
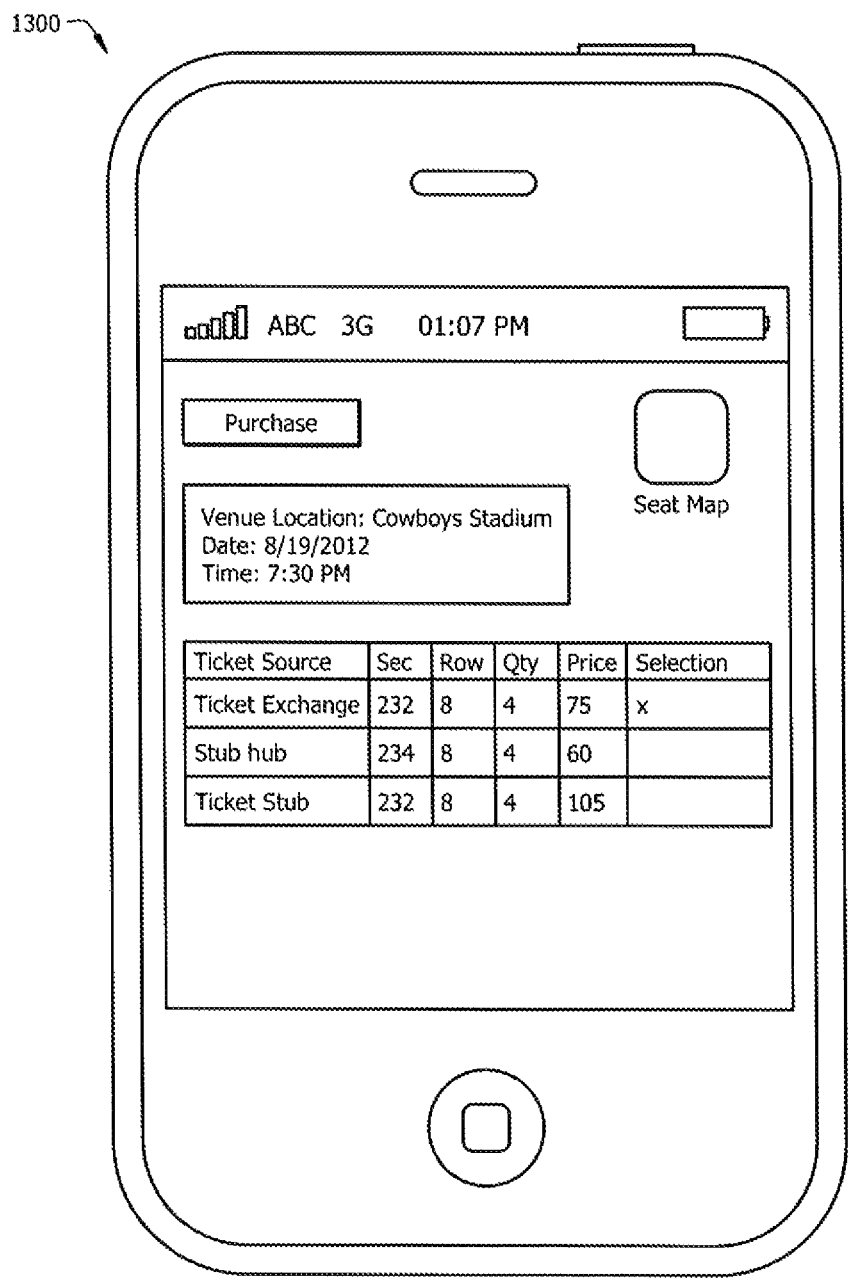
FIG. 13 generally illustrates system 100 facilitating ticket exchange, wherein the results of a ticket search are sortable in columns, according to one embodiment of the present disclosure.

FIG. 13 generally illustrates an embodiment of system 100 facilitating ticket exchange, wherein the results of a ticket search are sortable in columns, some embodiments as presented on an inquirer 1300. In some embodiments, the available tickets may be sorted and grouped by a plurality of columns, such as, section, row, or ticket source. In some embodiments, the user may select one or more desired tickets for purchase from the results screen. The system 100 may then redirect the user to the selected ticket seller website to complete the transaction. In other embodiments, system 100 may purchase the selected tickets on behalf of the user.

Figure 14:
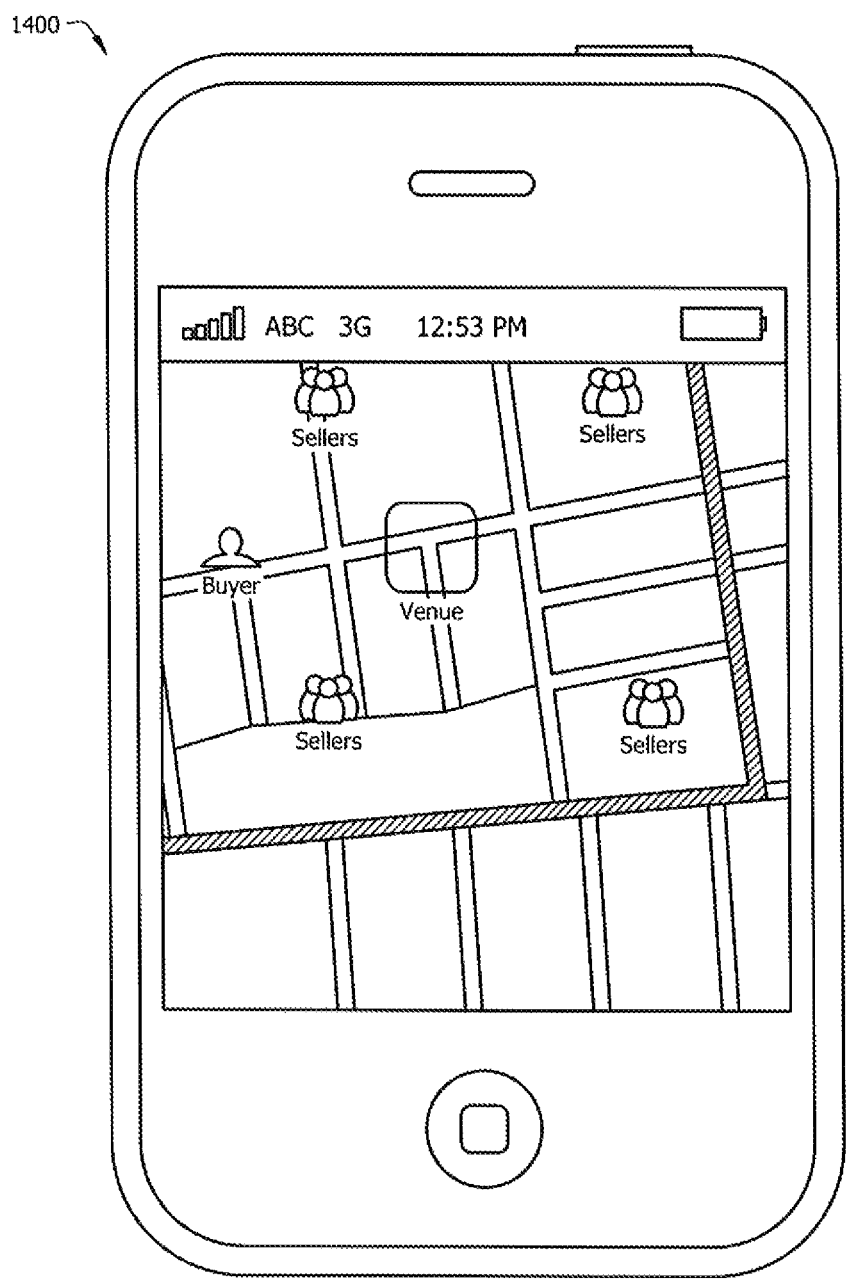
FIG. 14 generally illustrates system 100 facilitating ticket exchange, wherein the results of a ticket search may be displayed on a map of a user-specified are, according to one embodiment of the present disclosure.

FIG. 14 generally illustrates an embodiment of system 100 facilitating ticket exchange, wherein the results of a ticket search may be displayed on a map, some embodiments, as presented on an inquirer 1400. In some embodiments, system 100 may guide the user to the selected seller to complete the transaction. In other embodiments, system 100 may purchase the selected tickets on behalf of the user.

Figure 15:
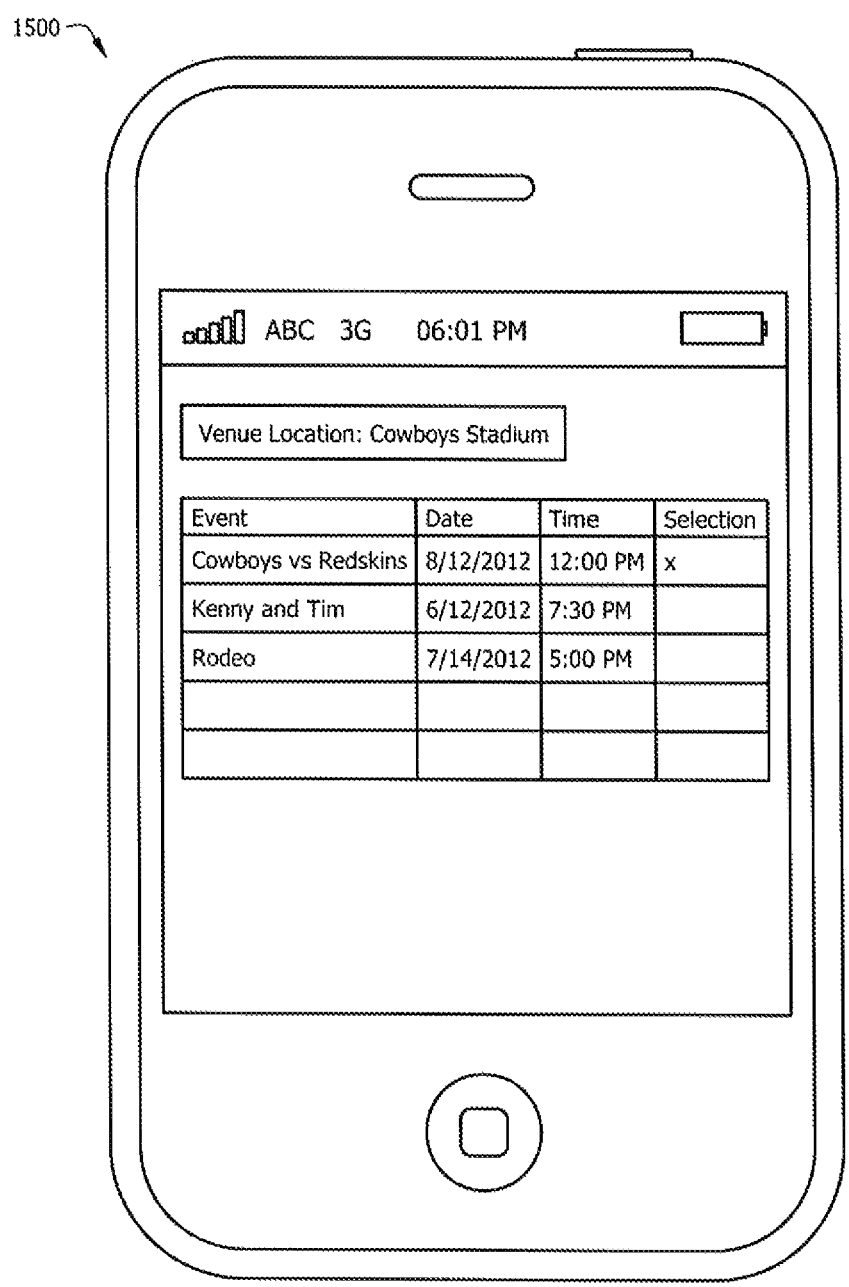
FIG. 15 generally illustrates system 100 facilitating ticket exchange, wherein the results of a ticket search may be filtered by a venue, according to one embodiment of the present disclosure.

FIG. 15 generally illustrates an embodiment of system 100 facilitating ticket exchange, wherein the results of a ticket search may be filtered by a venue, some embodiments, as presented on an inquirer 1500. In other embodiments, the results of the ticket search may be filtered by other categories, such as, by date, event type (sport, theater, concert, etc.), other suitable category, or a combination thereof.

It should be understood that FIGS. 9-15 are for illustrative purposes only and that any other suitable search and display screen could be used in conjunction with or in lieu of the screens herein according to some embodiments of the present disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The processes described in FIGS. 2-6 and/or operations thereof may be implemented by various systems, such as the system described in FIGS. 1 and/or 7-15. In addition, various operations may be added, deleted, and/or modified. In some implementations, operation(s) of the described processes may be performed in combination with other processes.

In various embodiments, the system may include memory that stores data (e.g., valid ticket information, event information, etc.) and one or more modules executable by a processor. The modules may perform one or more of the operations in the described processes and/or portions thereof.

In various embodiments, a graphical user interface (GUI) generated by the validation manager may be displayed on a presentation interface, such as display, of the inquirer or other computer system. GUI may be operable to allow the user of inquirer to interact with repositories, the validation manager, third party websites, etc. Generally, GUI provides the user of the inquirer with an efficient and user-friendly presentation of data provided by the validation manager. GUI includes a plurality of displays having interactive fields, pull-down lists, and buttons operated by the user. And in one example, GUI presents an explore-type interface and receives commands from the user. It should be understood that the term graphical user interface may be used in the singular or in the plural to describe one or more graphical user interfaces in each of the displays of a particular graphical user interface. Further, GUI contemplates any graphical user interface, such as a generic web browser, that processes information in server 111 and/or client 130 and efficiently presents the information to the user. In some implementations, GUI may present a web page embedding business content. The validation manager can accept data from the user of the inquirer via a web browser (e.g., Microsoft Internet Explorer or Google Chrome) and return the appropriate Hyper Text Markup Language (HTML) or eXtensible Markup Language (XML) responses.

Although users have been described as a human, a user may be a person, a group of people, a person or persons interacting with one or more computers, and/or a computer system. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. For example, various portions of the described system (e.g., the validation manager 126 and/or inquirer 140) may include one or more modules stored on a memory and executable by a processor. These module(s) may perform one or more of the described processes, described systems, and/or portions thereof.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer implemented method comprising:
receiving a captured barcode image of a ticket from an inquirer,
decoding the barcode image;
extracting ticket information from the decoded barcode, wherein the ticket information comprises event information, and wherein extracting ticket information comprises extracting from the ticket one or more authenticity identifiers;
retrieving valid ticket information associated with the ticket from a database;
determining whether the ticket is valid at least partially based on a comparison of the extracted ticket information from the barcode image and the retrieved valid ticket information;
transmitting a validation fail message responsive to a determination that the ticket is not valid;
transmitting one or more of the extracted authenticity identifier to a user for verification; and
transmitting event ticket information associated with the ticket.

2. The method of claim 1 further comprising receiving a captured image of the ticket from the inquirer, and wherein receiving the captured barcode image comprises receiving the captured image of the ticket including the barcode image.

3. The method of claim 1 further comprising:
receiving a captured image of the ticket from the inquirer, and
receiving ticket information associated with the ticket, wherein the ticket information was automatically determined based on the captured image of the ticket;
wherein determining whether a ticket is valid is at least partially based on the received ticket information.

4. The method of claim 1 further comprising receiving ticket information associated with the ticket, wherein the ticket information was automatically determined by the inquirer using NFC, and wherein determining whether a ticket is valid is at least partially based on the received ticket information.

5. The method of claim 1 further comprising transmitting a validation success message responsive to a determination that the ticket is valid.

6. The method of claim 1 wherein event ticket information comprises at least one of an image of a view from a ticket seat associated with the ticket, a retail value of the ticket, one or more links to information, whether the ticket has already been transferred to another buyer, or one or more reviews related to a seller of the ticket.

7. The method of claim 1 wherein determining whether the ticket is valid is based on criteria provided by a user.

8. The method of claim 1 further comprising:
receiving a captured image of the ticket from a first inquirer, and
transmitting the captured image of the ticket to a second inquirer, wherein the validation fail message is transmitted to the second inquirer responsive to a determination that the ticket is not valid.

9. The method of claim 1 further comprising transmitting an insurance purchase option based at least partially on one or more risk factors associated a validity of the ticket.

10. The method of claim 1 further comprising:
transmitting an insurance purchase option based at least partially on one or more risk factors associated with a validity of the ticket;
automatically determining a cost of insurance based on one or more risk factors associated with the ticket; and
transmitting the determined cost.

11. The method of claim 1 wherein one or more of the authenticity identifiers comprises at least one of a watermark, a hologram, a ultraviolet light hologram, ultraviolet light ink, microtext, photographic perforation, or a ghost image, and wherein extracting ticket information from the decoded barcode further comprises extracting one or more of the identifiers; and wherein determining whether the ticket is valid at least partially based on a comparison of the extracted event information from the barcode image and the retrieved valid ticket information and a comparison of one or more of the extracted identifiers from the barcode image to the retrieved valid ticket information.

12. A computerized method comprising:
receiving a captured barcode image of a ticket from a first inquirer,
decoding the barcode image;
extracting ticket information from the decoded barcode;
retrieving valid ticket information associated with the ticket from a database;
determining whether the ticket is valid at least partially based on the extracted ticket information and the retrieved valid ticket information;
transmitting a validation success message to a second inquirer responsive to a determination that the ticket is valid; and
transmitting first inquirer location information to the second inquirer, wherein the first inquirer location information comprises information about the location of the first inquirer.

13. The method of claim 12 further comprising transmitting a validation failure message to the second inquirer responsive to a determination that the ticket is not valid.

14. The method of claim 12 further comprising:
receiving ticket holder information; and
determining first inquirer location information associated with the first inquirer based at least partially on the ticket holder information.

15. The method of claim 12 wherein retrieving valid ticket information comprises communicating with a third party service to request and receive valid ticket information.

16. The method of claim 12 further comprising:
receiving a request from the second inquirer for available tickets;
retrieving ticket information for one or more tickets available for purchase; and
wherein the received captured image of the ticket comprises at least one of the tickets available for purchase.

17. A computer implemented method comprising:
receiving one or more captured barcode images of one or more tickets from an inquirer, wherein one or more of the tickets comprise a first ticket;
decoding one or more barcode images;
extracting ticket information from one or more of the decoded barcode images;
retrieving valid ticket information associated with one or more of the tickets from a database;
determining whether one or more of the tickets are valid at least partially based on the extracted ticket information and the retrieved valid ticket information;
transmitting one or more validation success message associated with one or more of the tickets responsive to a determination that one or more of the tickets are valid;
transmitting one or more validation failure messages associated with one or more of the tickets responsive to a determination that one or more of the tickets are not valid;
transmitting a list of websites where the seller may list one or more of the tickets for sale;
listing one or more of the tickets for sale on first websites, wherein the first websites comprise one or more of the websites of the list of websites;
determining whether the first ticket has sold on one of the first websites; and
removing at least one of the listing of the first tickets from one or more of the other first websites if a determination is made that the first ticket has sold.

18. The method of claim 17 further comprising:
determining one or more pricing suggestions for one or more of the tickets; and
transmitting one or more of the pricing suggestions to the inquirer.

19. The method of claim 17 further comprising automatically removing one or more of the tickets for sale from a listing on a website when one or more of the tickets are sold.

20. The method of claim 17 further comprising generating a dashboard for presentation on the inquirer, wherein the dashboard comprises listing status for one or more of the tickets.

* * * * *